US012791107B2

(12) United States Patent
Kang

(10) Patent No.: US 12,791,107 B2
(45) Date of Patent: Nov. 10, 2026

(54) CHECK VALVE AND BRAKE SYSTEM INCLUDING SAME

(71) Applicant: HL MANDO CORPORATION, Gyeonggi-do (KR)

(72) Inventor: Kiwon Kang, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 682 days.

(21) Appl. No.: 17/919,521

(22) PCT Filed: Apr. 19, 2021

(86) PCT No.: PCT/KR2021/004858
§ 371 (c)(1),
(2) Date: Oct. 17, 2022

(87) PCT Pub. No.: WO2021/210967
PCT Pub. Date: Oct. 21, 2021

(65) Prior Publication Data

US 2023/0160486 A1 May 25, 2023

(30) Foreign Application Priority Data

Apr. 17, 2020 (KR) ........................ 10-2020-0046398

(51) Int. Cl.
*F16K 27/02* (2006.01)
*B60T 13/14* (2006.01)
(Continued)

(52) U.S. Cl.
CPC .......... *F16K 15/042* (2013.01); *B60T 13/142* (2013.01); *B60T 13/686* (2013.01);
(Continued)

(58) Field of Classification Search
CPC .... B60T 13/745; B60T 13/686; F16K 15/042; F16K 15/044; F16K 27/0263; F16K 27/0245; F16K 15/026
See application file for complete search history.

(56) References Cited

U.S. PATENT DOCUMENTS

| | | | | |
|---|---|---|---|---|
| 17,530 A * | 6/1857 | Walsh | F04B 39/1033 | 137/512 |
| 183,806 A * | 10/1876 | Kellogg | F16K 15/042 | 137/533.27 |

(Continued)

FOREIGN PATENT DOCUMENTS

| | | |
|---|---|---|
| CN | 1643257 | 7/2005 |
| CN | 100360356 | 1/2008 |

(Continued)

OTHER PUBLICATIONS

Translation of JP 6-286984, retrieved Mar. 20, 2025 (Year: 2025).*

(Continued)

*Primary Examiner* — Bradley T King
(74) *Attorney, Agent, or Firm* — WOMBLE BOND DICKINSON (US) LLP

(57) ABSTRACT

Provided is an check valve. The check valve comprising a plurality of valve parts in which an internal flow path is selectively open/closed by opening/closing members, wherein the plurality of the valve parts are stacked in a line. And the check valve further comprising a cylinder-shaped valve housing open on one side, wherein each opening/closing member of the plurality of valve parts is received from the open one side of the valve housing.

5 Claims, 12 Drawing Sheets

(51) Int. Cl.
*B60T 13/68* (2006.01)
*B60T 15/02* (2006.01)
*F16K 11/10* (2006.01)
*F16K 15/04* (2006.01)

(52) U.S. Cl.
CPC ............ *B60T 15/028* (2013.01); *F16K 11/10* (2013.01); *F16K 15/044* (2013.01); *F16K 27/0209* (2013.01); *B60T 2270/402* (2013.01); *B60T 2270/404* (2013.01); *B60T 2270/82* (2013.01)

(56) References Cited

U.S. PATENT DOCUMENTS

| | | | | | |
|---|---|---|---|---|---|
| 2,707,485 | A * | 5/1955 | Royal | F16K 15/042 | 137/533.13 |
| 3,491,788 | A * | 1/1970 | Kilayko | F16K 15/042 | 137/433 |
| 3,661,167 | A * | 5/1972 | Hussey | F16K 15/042 | 137/533.15 |
| 3,746,038 | A | 7/1973 | Simmons | | |
| 4,253,524 | A * | 3/1981 | Erickson | F16K 15/042 | 137/512.1 |
| 4,721,345 | A * | 1/1988 | Nishimura | B60T 8/4225 | 303/113.1 |
| 5,002,662 | A * | 3/1991 | Ledtje | F16K 15/042 | 210/136 |
| 10,071,717 | B2 * | 9/2018 | Kim | B60T 13/662 | |
| 2001/0038243 | A1 | 11/2001 | Isono | | |
| 2005/0034769 | A1 * | 2/2005 | Moreno | F15B 13/0405 | 137/596.17 |
| 2005/0087233 | A1 * | 4/2005 | Reilly | F16K 15/044 | 137/549 |
| 2006/0201557 | A1 * | 9/2006 | Shieh | F16K 15/04 | 137/533.11 |
| 2007/0199437 | A1 | 8/2007 | Sakai et al. | | |
| 2017/0254436 | A1 * | 9/2017 | Zhang | F16K 31/0668 | |
| 2018/0259077 | A1 * | 9/2018 | Shinoyama | F16K 17/196 | |
| 2018/0339689 | A1 * | 11/2018 | Jeon | B60T 8/00 | |
| 2019/0135256 | A1 * | 5/2019 | Lee | B60T 8/409 | |
| 2020/0063411 | A1 * | 2/2020 | Di Monte | F16K 47/012 | |
| 2021/0131425 | A1 * | 5/2021 | Kim | B60T 8/4031 | |
| 2022/0010886 | A1 * | 1/2022 | Byun | F16K 11/105 | |
| 2022/0185257 | A1 * | 6/2022 | Choi | F16D 65/22 | |
| 2023/0055316 | A1 * | 2/2023 | Weis | F15B 13/01 | |
| 2023/0257977 | A1 * | 8/2023 | Di Monte | F16K 15/042 | 137/512 |

FOREIGN PATENT DOCUMENTS

| | | | |
|---|---|---|---|
| CN | 204358179 | | 5/2015 |
| DE | 10 2006 010 706 | | 9/2007 |
| JP | 6-286984 | | 10/1994 |
| JP | 7-14183 | U | 3/1995 |
| JP | 11-13929 | | 1/1999 |
| KR | 1999-0031162 | U | 7/1999 |
| KR | 10-2013-0092045 | | 8/2013 |
| KR | 10-2016-0090675 | | 8/2016 |
| KR | 10-2019-0136208 | | 12/2019 |

OTHER PUBLICATIONS

Translation of DE 10 2006 010 706, retrieved Mar. 19, 2025 (Year: 2025).*

International Search Report for PCT/KR2021/004858 mailed on Aug. 13, 2021 and its English from WIPO (now published as WO 2021/210967).

Written Opinion of the International Searching Authority for PCT/KR2021/004858 mailed on Aug. 13, 2021 and its English Machine Translation by Google Translate (now published as WO 2021/210967).

Extended European Search Report dated Apr. 17, 2024 for European Patent Application No. 21789176.1.

Office Action dated Jul. 25, 2025 for Chinese Patent Application No. 202180037316.6 and its English translation provided by Applicant's foreign counsel.

* cited by examiner

CHECK VALVE AND BRAKE SYSTEM INCLUDING SAME

TECHNICAL FIELD

The present invention relates to a check valve and a brake system, and more particularly, to a check valve used in a brake system of a vehicle and a brake system including the same.

BACKGROUND ART

A brake system is generally intended to efficiently prevent a slip phenomenon of a wheel which may occur during braking, sudden starting or sudden acceleration of a vehicle.

A brake system includes a plurality of solenoid valves for controlling a braking hydraulic pressure transmitted from a master cylinder to a wheel cylinder side, and a number of check valves for preventing a reverse flow of oil, which are installed in a modulator block in which a flow path of a hydraulic circuit is formed and which operate in accordance with a braking hydraulic pressure.

Conventional brake systems supply a required brake pressure to a wheel cylinder by means of a vacuum booster when a driver depresses a brake pedal. However, in recent years, an electronic brake system has been used, in which a driver's braking intention is transmitted as an electrical signal from a pedal displacement sensor that senses a displacement of a brake pedal when the driver depresses the brake pedal, and a hydraulic pressure supply device that supplies a brake pressure to a wheel cylinder based on the received signal is provided.

An example of an electronic brake system includes Korean Patent Publication No. 10-2013-0092045. According to the disclosed document, an electronic brake system provided with a hydraulic pressure supply device operates a motor in accordance with a tread force of a brake pedal to generate a brake pressure. At this time, the braking pressure is generated by converting the rotational force of the motor into a linear motion and pressing a piston.

In a brake system, in order to control the flow of oil in one direction, a plurality of check valves are provided at various positions in a flow path formed in a modulator block. For example, the check valves may be provided in a flow path connecting a hydraulic pressure supply device and a reservoir, a distribution flow path of a wheel cylinder, a simulator connection flow path, or the like.

As is well known, a check valve is assembled in the shape of a single component while including a valve housing, a ball provided in the valve housing to open and close a flow path, an elastic member that elastically supports the ball, a retainer or a plug member that prevents the elastic member from being detached, and the like. The check valve is then installed on a brake system so that oil flows only in one direction.

A conventional check valve is not easy to manufacture because each component has to be manufactured through a process forming and a press scheme, and thus the manufacturing cost is high.

Since a plurality of check valves provided in a modulator block of a vehicle are each provided in the shape of a single component, it is necessary not only to secure holes in the modulator block by the number of check valves when applied to a brake system, but also to independently connect peripheral flow paths.

Accordingly, a brake system requires as much space for assembly as the number of check valves installed, which in turn increases the size of the product and adversely affects automotive parts where size and weight are important.

DETAILED DESCRIPTION OF THE INVENTION

Technical Problem

According to an embodiment of the present invention, a check valve which is in a simplified structure and in which a plurality of valve parts are integrally formed and a brake system including the check valve are provided.

Technical Solution

According to an aspect of the present invention, there may be provided a check valve including a plurality of valve parts in which an internal flow path is selectively open/closed by an opening/closing member, the plurality of valve parts being stacked in a line.

In addition, the valve housing may further include a cylinder-shaped valve housing open on one side, wherein each opening/closing member of the plurality of valve parts is received from the open one side of the valve housing.

In addition, the valve housing may include a housing body that is stepped along a longitudinal direction and sequentially receives the opening/closing members, and a housing cap that is engaged with the housing body.

In addition, the housing body may include a first body and a second body longitudinally engaged with the first body, the first and second bodies each including at least one valve part.

In addition, the first body and the second body may each include a body hole in which the opening/closing members selectively contact by a pressure of fluid.

In addition, the valve housing may include a plurality of body holes communicating between the inside and the outside, and each opening/closing member of the plurality of valve parts is provided between two adjacent body holes.

In addition, each valve part of the plurality of valve parts may further include a valve seat including an orifice through which fluid passes, an elastic member elastically supporting one side of the opening/closing members which is selectively in contact with the orifice, and a filter cap engaged with the valve seat to receive the opening/closing members and supporting the other side of the elastic member.

In addition, a valve seat of another adjacent valve part may be engaged with a filter cap of any one of the plurality of valve parts.

In addition, each opening/closing member of the plurality of valve parts may be arranged in the valve housing so as to pass fluid in one direction.

In addition, the valve housing may include a first body hole communicating between the inside and the outside, a second body hole, a third body hole, and a fourth body hole, and the plurality of valve parts may include a first valve part provided between the first and second body holes of the valve housing, a second valve part disposed between the second and third body holes, and a third valve part formed between the third and fourth body holes.

In addition, the first valve part, the second valve part, and the third valve part may be arranged in the valve housing so as to pass fluid in one direction.

In addition, the first valve part to the third valve part may each further include a valve seat having an orifice through which fluid passes, an elastic member for elastically supporting one side of the opening/closing members in selective contact with the orifice, and a filter cap for receiving the opening/closing members by being engaged with the valve seat and supporting the other side of the elastic member, and a valve seat of the adjacent second valve part may be engaged with the filter cap of the first valve part.

In addition, the valve housing may include a housing body provided in a cylindrical shape with one side open, and a housing cap engaged with the housing body with the first to third valve parts received in the open one side, the housing member may include a first body and a second body separated in a longitudinal direction, one of the first and second bodies may include the first valve part, and the other may include the second valve part and the third valve part.

In addition, the first body may include a first body hole as an orifice with which an opening/closing member of the first valve part selectively comes into contact, the second body may include a second body hole as an orifice with which an opening/closing member of the second valve part selectively comes into contact, and the third valve may include a valve seat provided with an orifice with which an opening/closing member selectively comes into contact.

In addition, the opening/closing members provided in at least one of the plurality of valve parts may be provided in the shape of a lip seal.

In addition, at least one valve part of the plurality of valve parts may include a valve seat comprising a small diameter head, a large diameter flange, and a small diameter valve body; and a filter cap engaged with the valve body, wherein the opening/closing members in the form of a lip seal are fitted into the valve member of the valve seat and are positioned between the flange and the filter cap.

In addition, the opening/closing members provided in at least one of the plurality of valve parts may be provided in a ball shape.

According to another aspect of the present invention, there may be provided a brake system including: a check valve which is provided according to claim 1; a reservoir which a pressurizing medium is stored; a master cylinder which is connected to the reservoir, the master cylinder having a master chamber and a master piston for discharging the pressurizing medium in response to a tread force of a brake pedal; a hydraulic pressure supply device which operates by an electrical signal to generate a hydraulic pressure; and a hydraulic control unit which has a first hydraulic circuit and a second hydraulic circuit to transmit the hydraulic pressure discharged from the hydraulic pressure supply device to wheel cylinders provided on two wheels, respectively, wherein the check valve is installed in a flow path connecting the hydraulic pressure supply device and the hydraulic control unit, and selectively transmits the hydraulic pressure of the hydraulic pressure supply device to the first hydraulic circuit or the second hydraulic circuit.

Advantageous Effects

A check valve and a brake system including the check valve according to an embodiment of the present invention may greatly improve the mass productivity of products because a plurality of valve parts are assembled in a single valve housing, thereby reducing the manufacturing cost due to a reduction in the number of parts and facilitating the assembly operation.

In addition, since a cheek valve and a brake system including the same according to an embodiment of the present invention simplify the structure of a valve part, the same may be manufactured by forging, which is a low cost method, and may reduce the component cost, and when applied to a vehicle, it is possible to solve the installation space constraints of the check valve and a flow path in a modular block, thereby improving the design freedom.

MODE FOR CARRYING OUT THE INVENTION

Figure 1:
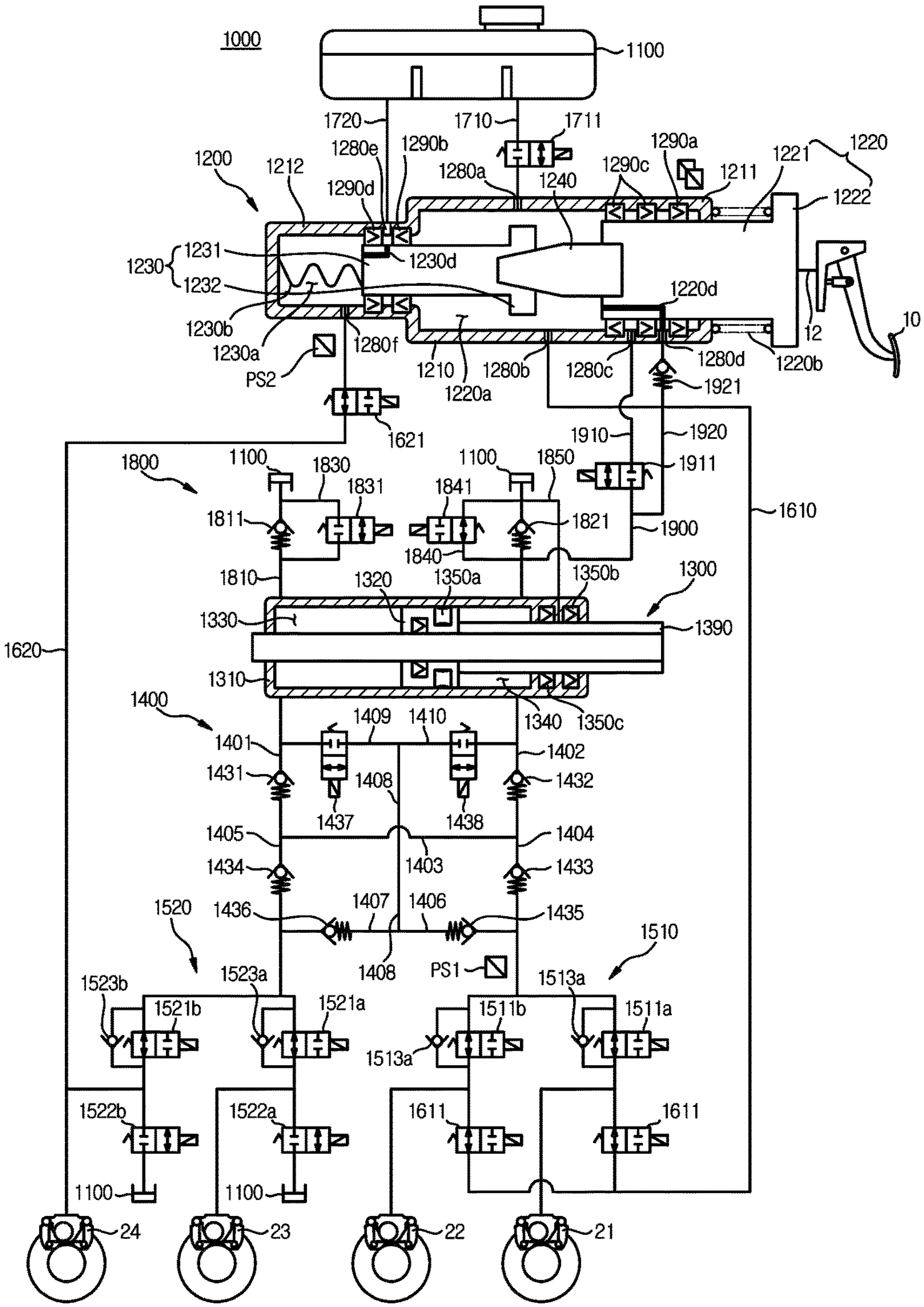
FIG. 1 is a view exemplifying a brake system of a vehicle in which a check valve according to a first embodiment of the present invention is used.

Preferred embodiments of the present invention will now be described in detail with reference to the accompanying drawings. Before this, the terms and words used in the specification and claims should not be construed as being limited to their ordinary or dictionary meanings, but should be interpreted as meaning and concept consistent with the technical concept of the present invention based on the principle that the inventors may appropriately define the concept of terms to describe their own invention in the best manner. Therefore, it should be understood that the embodiments described in the present specification and the configurations shown in the drawings are only the most preferred embodiments of the present invention and do not represent all the technical ideas of the invention, and various equivalents and modifications may be made thereto at the time of filing the present application.

FIG. 1 is a hydraulic circuit diagram showing an electronic brake system 1000 in which a check valve according to a first embodiment of the present invention is used.

Referring to FIG. 1, an electronic brake system 1000 according to an embodiment of the present invention includes: a reservoir 1100 in which a pressurizing medium is stored; an integrated master cylinder 1200 that provides a reaction force according to the pedal effort of a brake pedal 10 to ad river and pressurizes and discharges a pressurizing medium such as brake oil received inside; a hydraulic pressure supply device 1300 that receives the driver's braking intention as an electrical signal by a pedal displacement sensor that detects the displacement of the brake pedal 10 and generates hydraulic pressure of the pressurizing medium through a mechanical operation; a hydraulic control unit 1400 for controlling the hydraulic pressure provided from a hydraulic pressure supply device 1300; hydraulic circuits 1510, 1520 having a wheel cylinder 20 for braking each wheel (RR, RL, FR, and FL) by transferring the hydraulic pressure of the pressurizing medium; a dump control unit 1800 provided between the hydraulic pressure supply device 1300 and the reservoir 1100 to control the flow of the pressurizing medium; backup flow paths 1610, 1620 hydraulically connecting the integrated master cylinder 1200 and the hydraulic circuits 1510, 1520; a reservoir flow path 1700 hydraulically connecting the reservoir 1100 and the integrated master cylinder 1200, and an inspection flow path 1900 connected to the master chamber of the integrated master cylinder 1200; an electronic control unit (ECU, not shown) that controls the hydraulic pressure supply device 1300 and various valves based on the hydraulic pressure information and the pedal displacement information.

The integrated master cylinder 1200 is provided so that, when the driver applies a tread force to the brake pedal 10 for braking operation, the driver provides a reaction force thereto to provide a stable pedal feel, and at the same time, the brake pedal 10 is actuated to pressurize and discharge the pressurizing medium contained therein.

The highly integrated master cylinder 1200 may be arranged coaxially in one cylinder body 1210 with a simulation unit for supplying the driver with a pedal feel and a master cylinder unit for pressurizing and discharging the pressurizing medium received inside by the pedal depression force.

Specifically, an integrated master cylinder 1200 may include a cylinder body 1210 that has a chamber formed at the inside, a first master chamber 1220*a* that is formed on the inlet side of the cylinder body 1210 to which a brake pedal 10 is connected, a first master piston 1220 that is provided in the first master chambers 1220*a* and is displaceably provided by actuation of the brake pedal 10, a second master piston 1230 that is disposed on a second master chamber 1230*a* on the inner side or on the front side (left side with reference to FIG. 1) of the first master pistons 1220, and a pedal simulator 1240 that provides a pedal sensation through an elastic restoring force that occurs during compression and is disposed between the first master piston 1220 and the second master piston 1230.

A first master chamber 1220*a* and a second master chamber 1230*a* may be formed sequentially from the brake pedal 10 side (right side with reference to FIG. 1) to the inner side (left side with reference to FIG. 1), on a cylinder body 1210 of an integrated master cylinder 1200. In addition, the first master piston 1220 and the second master piston 1230 are provided in each of the first and second master chambers 1220*a*, 1230*a*, and may form a hydraulic pressure or a negative pressure in the pressurizing medium received in each chamber according to the forward and backward movements.

The cylinder body 1210 may include a large-diameter portion 1211 in which the first master chamber 1220*a* is formed, and the inner diameter thereof is relatively large, and a small-diameter portion 1212 in which the second master chamber 1230*a* is formed. The large-diameter portion 1211 and the small-diameter portion 1212 of the cylinder body 1210 may be integrally formed.

The actuation first master chamber 1220*a* may be formed inside a large diameter portion 1211, which is an inlet side or a rear side (right side with reference to FIG. 1) of the cylinder body 1410, and a first master piston 1220 connected to the brake pedal 10 through an input rod 12 may be reciprocally received in the first master chambers 1220*a*.

In the first master chamber 1220*a*, a pressurizing medium may be introduced and discharged through the first hydraulic pressure port 1280*a* and the second hydraulic pressure ports 1280*b*, the third hydraulic pressure port 1280*c* and the fourth hydraulic pressure port 1280*d*. The first hydraulic pressure port 1280*a* may be connected to a first reservoir flow path 1710, hick will be described later, so that pressurizing medium flows from the reservoir 1100 into the first master chamber 1220*a*, or pressurizing medium received in the first master chamber 1220*a* may be discharged to the reservoir, and the second hydraulic pressure port is connected to the first backup flow path 1610, so as to discharge pressurizing medium to the side of the first backup flow path.

In addition, the first master chamber 1220*a* is connected to the first and second branch flow paths 1910, 1920 of the inspection flow path 1900 described later through the third hydraulic pressure port 1280*c* and the fourth hydraulic pressure port 1280*d*, respectively, so that the pressurizing medium contained in the first master chamber 1220*a* may be discharged toward the inspection fluid path 1900 or may flow from inspection flow path 1900 into the first master chamber 1220*a*.

The first master piston 1220 is received in the first a 1220*a*, and may be advanced (left direction with reference to FIG. 1) to form a hydraulic pressure by pressurizing a pressurizing medium received in a first master chamber 1220*a*, or may be moved backward (right direction with reference to FIG. 1) to create a negative pressure in the interior of the first master chamber 1220*a*. The first master piston 1220 may include a first body 1121 formed in a cylindrical shape so as to be in close contact with an inner circumferential surface of the first master chamber 1220*a*, and a first flange 1222 formed to extend in a radial direction at a rear end (a right end with reference to FIG. 1), to which the input rod 14 is connected. The first master piston 1220 may be elastically supported by a first piston spring 1120*b*, which may be provided with one end supported on the front surface (left side with reference to FIG. 1) of the first flange 1022 and the other end supported by the outer surface of the cylinder body.

The first master piston 1220 is provided with a first cut-off hole 1220*d* that communicates with the first master chamber 1220*a* and communicates with a fourth hydraulic pressure port 1280*d* and a second branch flow path 1920 in a non-operation state, that is, a preparation state before displacement occurs. Further, a first sealing member 1290*a* may be provided between the outer peripheral surface of the first master piston 1220 and the cylinder body 1210 to seal the first master chamber 1220*a* from the outside. The first sealing member 1290*a* may be provided so as to be in contact with the outer circumferential surface of the first master piston 1220 by being seated in a receiving groove formed in a recess on the inner circumferential surface thereof, thereby preventing the pressurizing medium contained in the first master chamber 1220*a* from leaking to the outside and preventing external foreign matters from flowing into the first master chamber 1220*a*. The first sealing member 1290*a* may be provided on the outermost side of the inner circumferential surface of the cylinder body 110, that is, on the rear side (right side with reference to FIG. 1) of the fourth hydraulic pressure port 1280*d* to which the later-described second branch flow path 1920 is connected.

A third sealing member 1290*c* may be provided between the outer peripheral surface of the first master piston 1220 and the cylinder body 1210 to block the flow of the pressurizing medium flowing into the first master chamber 1220*a* from the first branch flow path 1910 connected to the third hydraulic pressure port 1280*c*. The third sealing members 1290*c* may be respectively seated in a pair of receiving grooves which are respectively recessed in front and rear of the third hydraulic pressure port 1280*c* on the inner circumferential surface of the cylinder body 1210 and contact the outer circumferential surface of the first master piston 1220. The pair of third sealing members 1290*c* may be provided in front of the first sealing member 1290*a* (left side with reference to FIG. 1), and may allow the flow of the pressurizing medium contained in the first master chamber 1220*a* to be transmitted to the first branch flow path 1910 through the third hydraulic pressure port 1280*c*, but may block the flow of the pressurizing medium from the first branch flow path 1910 into the first master chamber 1220*a*.

The second master chamber 1230*a* may be formed at the inside of the small diameter portion 1212, which is the inside or the front side (left side with reference to FIG. 1) on the cylinder body 1210, and the second master piston 1230 may be reciprocally received in the second master chamber 1230*a*.

The pressurizing medium may be introduced into and discharged from the second master chamber 1230*a* through the fifth hydraulic pressure port 1280*e* and the sixth hydraulic pressure port 1280*f*. The fifth hydraulic pressure port 1280*e* is connected to a second reservoir flow path 1720, which will be described later, so that the pressurizing medium contained in the reservoir 1100 may flow into the second master chamber 1230*a*. In addition, the sixth hydraulic pressure port 1280*d* is connected to the second backup flow path 1620 to be described later, so that the pressurizing medium contained in the second master chamber 1230*a* may be discharged to the side of the second backup flow path 1620, and conversely, the pressurizing medium may flow from the second backup flow path 1620 toward the side of the second master chamber 1230*a*.

The second master piston 1230 is received in the second master chamber 1230*a*, and may form the hydraulic pressure of the pressurizing medium received in the second master chamber 1230*a* by advancing and form the negative pressure in the second master chamber 1230*a*. The second master piston 1230 may include a second body 1231 formed in a cylindrical shape so as to closely contact the inner circumferential surface of the second master chamber 1430*a*, and a second flange 1232 formed radially at a rear end portion (right end portion with reference to FIG. 1) of the first body 231 and disposed inside the first master chamber. The diameter of the second flange 1232 may be larger than the inner circumferential surface diameter of a second master chamber 1230*a*. The second master piston 1230 may be elastically supported by a second piston spring 1230*b*, and the second piston spring 1230*b* may be provided so that one end thereof is supported on a front surface (a left side surface with reference to FIG. 1) of the second body 1231 and the other end thereof on an inner surface of the cylindrical body 210.

A second sealing member 1290*b* may be provided between the outer circumferential surface of the second master piston 1230 and the cylinder body 1210 to seal the first master chamber 1220*a* with respect to the second master chamber 1230*a*. The second sealing member 1290*b* may be provided so as to be seated in a receiving groove recessed on the inner peripheral surface of the cylinder body 1210 and to be in contact with the outer periphery of the second master piston 1230, and may prevent the pressurizing medium contained in the first master chamber 1220*a* from leaking out to the second master chamber 1230*a* by the second sealing member 1290*b*.

The second master piston 1230 is provided with a second cut-off hole 1230*d* that communicates with the second master chamber 1230*a* and communicates with a fifth hydraulic pressure port 280*e* and a second reservoir flow path 1720 in a non-operation state, that is, a preparation state before displacement occurs. In addition, a fourth sealing member 1290*d* may be provided between the outer peripheral surface of the second master piston 1230 and the cylinder body 1210 to block the flow of the pressurizing medium discharged from the second master chamber 1230*a* to the second reservoir flow path 1720 connected to the fifth hydraulic pressure port 1280*e*. The fourth sealing member 1290*d* may be seated in a receiving groove recessed in front of the fifth hydraulic pressure port 1280*e* (left side with reference to FIG. 1) on the inner circumferential surface of the cylinder body 1210, and contact the outer circumferential surface of the second master piston 1230. The fourth sealing member 1290*d* may be provided in front of (left side with reference to FIG. 1) the second sealing member, and may allow the flow of the pressurizing medium transferred from the second reservoir flow path 1720 connected to the fifth hydraulic pressure port 1380*e* to the second master chamber 1430*a*, while blocking the flow thereof transferred from a second master space 1120*a* to the first and second hydraulic pressure ports 1620*e*.

The reciprocating-integrated master cylinder 1200 has the first master chamber 120*a* and the second master chamber 1230*a* independently of each other, so that safety in the event of failure of component elements may be ensured. For example, the first master chamber 1220*a* may be connected to one of the two wheel cylinders 21, 22 through a first backup flow path 1610, described below, and the second master chamber 1230*a* may be connected to the other two wheel cylinders 23, 24 through a second backup flow path 1620, described below, and thus, braking of the vehicle may be possible in the event of a problem such as a leak in any one chamber.

The pedal simulator 1240 may be provided between the first piston 1220 and the second master piston 1230, and may provide a driver with a pedal feel of the brake pedal 10 by the elastic restoring force thereof. Specifically, the pedal simulator 1240 may be interposed between the front surface of the first master piston 1220 and the rear surface of second master piston 1230, and may be made of an elastic material such as compressible and expandable rubber. The pedal simulator 1240 may include a cylindrical-shaped body that is at least partially inserted and supported on the front surface of the first master piston 1120 and a tapered portion that is inserted or supported at least partly on the rear surface of a second master piston, the tapered portion gradually decreasing in diameter toward the front (left side with reference to FIG. 1). At least part of both ends of the pedal simulator 1240 may be stably supported by being inserted into the first master piston 1220, respectively. Furthermore, it is also possible to provide a stable and familiar pedal feel to a driver by changing the elastic restoring force according to the degree of the tread force of the brake pedal 10 by the tapered portion.

A simulator valve 1711 is provided in the first reservoir flow path 1710 described later so that the flow of the pressurizing medium between the reservoir 1100 and the first master chamber 1220*a* may be controlled. The simulator valve 1711 may be provided as a normal closed-type solenoid valve which is normally closed and which, upon receiving an electrical signal from the electronic control unit, operates to open the valve and may be open in a normal operating mode of the electronic brake system 1000.

To explain the pedal simulation operation by the integrated master cylinder 1200, in the normal operation mode, the driver operates the brake pedal 10, and the first cut valve 1611 and the second cut valve 1621 provided in each of the first backup flow path 1610 and the second backup flow path 1620, which will be described later, are closed, while the simulator valve 1711 in the first reservoir flow path 1710 is open. As the operation of the brake pedal 10 proceeds, the first master piston 1220 advances, but as the second cut valve 1621 closes, the second master chamber 1230*a* closes, so that no displacement occurs in the second master piston 1230. At this time, the pressurizing medium contained in the first master chamber 1220*a* flows along the first reservoir flow path 1710 by the closing operation of the first cut valve 1611 and the opening operation of a simulator valve 2711. While the second master piston 1230 does not move forward, the first master piston 1220 continues to move forward and thus compresses the pedal simulator 1340, and the elastic restoring force of the pedal simulation 1440 may be provided to the driver as a pedal feel. Then, when the driver releases the braking force of the brake pedal 10, the first and second piston springs 1220*b*, 1230*b* and the elastic restoring force of a pedal simulator 1240 cause the first, second master piston 1120, 230 and the pedal simulator to return to the original shape and position, and the first master chamber 1220*a* may be filled with pressurizing medium supplied from the reservoir 1710 through the first reservoir flow path 1610.

Since the interior of the first master chamber 1220*a* and the second master chamber 1230*a* is always filled with pressurizing medium, as in the case of a pedal simulation, the friction between the first and second master pistons 1220 and 1230 is minimized, so that the durability of the integrated master cylinder 1200 is improved, as well as the entry of foreign substances from the outside may be blocked.

The homogenizer 1100 may house and store a pressurizing medium therein. The reservoir 1100 may be connected to the integrated master cylinder 1200, the hydraulic pressure supply device 1300 described below, and each component such as a hydraulic circuit described below to supply or receive pressurizing medium. Although several reservoirs 1100 are shown with the same reference numerals in the drawings, as an example to facilitate understanding of the invention, the reservoir 1100 may be provided as a single part or as a plurality of separate and independent parts.

The shock absorber flow path 1700 is provided to connect the integrated master cylinder 1200 and the reservoir 1100.

The reservoir flow path 1700 may include a first reservoir flow path 1710 that connects the first master chamber 1220*a* and the reservoir 1100, and a second reservoir flow path 1720 that connects the second master chamber 1230*a* and the reservoir 1100. To this end, one end of the first reservoir flow path 1710 may be in communication with the first master chamber 1220*a* by the first hydraulic pressure port 1280*a* of the integrated master cylinder 1200, the other end may be communicating with the reservoir 1100, and one end of the second reservoir flow path 1720 may be communicating with the second master chamber 1230*a* by the fifth hydraulic pressure port 1280*e* of the integrated master cylinder 1200, and the other end may be communicating with the reservoir 1100. In addition, as described above, the first reservoir flow path 1710 is provided with the simulator valve 1711 that opens in the normal operation mode, so that the flow of the pressurizing medium between the reservoir 1100 and the first master chamber 1220*a* through the first reservoir flow path 1710 may be controlled.

The brake hydraulic pressure supply device 1300 is arranged to receive an electric signal from a pedal displacement sensor that senses the displacement of the brake pedal 10 to generate the hydraulic pressure of the pressurizing medium through mechanical actuation.

The hydraulic pressure supply device 1300 may include a hydraulic pressure supply unit for supplying a pressure medium pressure to be transmitted to the wheel cylinder 20, a motor (not shown) for generating a rotational force by an electric signal of a pedal displacement sensor, and a power converting unit (not shown) for converting a rotational motion of the motor into a linear motion and transmitting the linear motion to the hydraulic pressure supply unit.

The hydraulic pressure supply unit includes a cylinder block 1310 in which a pressurizing medium is provided so as to be able to be received, a hydraulic piston 1320 housed in the cylinder block, a sealing member 1350 provided between the hydraulic piston 1320 and the cylinder block 1350 for sealing the pressure chambers 1330, 1340, and a drive shaft 1390 for transmitting the power output from the power conversion unit to the hydraulic pistons 1320.

The pressure chambers 1330, 1340 may include a first pressure chamber 1330 located in front of the hydraulic piston 1320 (left direction of the hydraulic piston 1320 with reference to FIG. 1) and a second pressure chamber 1340 located in the rear of the hydraulic piston 1320 (right direction of the hydraulic piston 1320 with reference to FIG. 1). That is, the first pressure chamber 1330 is defined by the front surface of the cylinder block 1210 and the hydraulic piston 1420 so as to vary in volume according to the movement of the hydraulic pistons 1520, and the second pressure chamber 1340 is defined by rear surfaces of the cylinder block 1310 and the hydraulic piston 1320.

The first pressure chamber 1330 is connected to a first hydraulic flow path 1401, which will be described later, through a first communication hole 1360*a* formed in the cylinder block 1310, and the second pressure chamber 1340 is connected through a second communication hole 1360*b* formed in a cylinder block.

The sealing member includes a piston sealing member 1350*a* provided between the hydraulic piston 1320 and the cylinder block 1410 to seal between the first pressure chamber 1330, and the second pressure chamber 1340, and a drive shaft sealing member 1450*b* provided between a chive shaft 1690 of the cylinder 1710, to seal an opening of the second and cylinder blocks 1840. The hydraulic pressure or the negative pressure in the first pressure chamber 1330 and the second pressure chamber 1340 caused by the forward or backward movement of the hydraulic piston 1320 is sealed by the piston sealing member 1150*a* and the drive shaft sealing member 1250*b* so as not to leak, and may be transmitted to the first hydraulic flow path 1401 and second hydraulic flow paths 1502 described later. In addition, a chamber sealing member 1350*c* may be provided between the second pressure chamber 1340 and the drive shaft sealing member 1350*b*, and the chamber sealing members 155*c* may allow the flow of the pressurizing medium flowing into the first pressure chamber 1330 through the auxiliary inflow path 1850, which will be described later, but may block the flowing of the pressurizing medium leaking out of the second pressure chamber 1340 and into the auxiliary inflow path 1850.

A motor (not shown) is provided to generate a driving force of the hydraulic piston 1330 by an electric signal output from the electronic control unit (ECU). The motor may include a stator and a rotor, thereby supplying power for generating displacement of the hydraulic piston 1320 by rotating in a forward or reverse direction. The rotational angular velocity and the rotational angle of the motor may be precisely controlled by a motor control sensor. Since the motor is a well-known technique, a detailed description thereof will be omitted.

A power conversion unit (not shown) is provided to convert the rotational force of the motor into linear motion. As an example, the power converter may be provided with a structure including a worm shaft (not shown), a worm wheel (not shown and a drive shaft 1390.

The worm shaft may be integrally formed with a rotational shaft of the motor, and a worm may be formed on an outer peripheral surface thereof to engage with the worm wheel to rotate the worm wheel. The worm wheel may be engaged with engage the drive shaft 1390 to linearly move the drive shaft 1390, which in turn is engaged with and integrally operates with the hydraulic piston 1320, thereby allowing the hydraulic piston 1320 to slide within the cylinder block 1310.

In other words, when the displacement of the brake pedal 10 is sensed by the pedal displacement sensor, the sensed signal is transmitted to the electronic control unit, which drives the motor to rotate the worm shaft in one direction. The rotational force of the worm shaft is transmitted to the drive shaft 1390 through the worm wheel, so that the hydraulic piston 1320 connected to the driving shaft may generate a hydraulic pressure in the first pressure chamber 1330 while advancing in the cylinder block 1310.

On the contrary, when the tread force of the brake pedal 10 is released, the electronic control unit drives the motor to rotate the worm shaft in the opposite direction. Thus, the worm wheel may also rotate in the opposite direction and the hydraulic piston 1320 connected to the drive shaft 1390 may generate a negative pressure in the first pressure chamber 1330 while reversing in the cylinder block 1310.

The generation of the hydraulic pressure and the negative pressure in the economizer second pressure chamber 1340 may be realized by operating in the opposite direction. That is, when the displacement of the brake pedal 10 is sensed by the pedal displacement sensor, the sensed signal is transmitted to the electronic control unit, which drives the motor to rotate the worm shaft in the opposite direction. The rotational force of the worm shaft is transmitted to the drive shaft 1390 through the worm wheel, so that the hydraulic piston 1320 connected to the driving shaft may generate a hydraulic pressure in the second pressure chamber 1340 while moving backward in the cylinder block 1310.

On the contrary, when the tread force of the brake pedal 10 is released, the electronic control unit drives the motor n one direction to rotate the worm shaft in one direction. Thus, the worm wheel also rotates in the opposite direction and the hydraulic piston 1320 connected to the drive shaft 1390 may generate a negative pressure in the second pressure chamber 1340 while advancing in the cylinder block 1310.

As described above, the hydraulic pressure supply device 1300 may generate a hydraulic pressure or a negative pressure in each of the first pressure chamber 1330 and the second pressure chamber 1340 depending on the rotational direction of the worm shaft by driving the motor, and may determine whether to transmit the liquid pressure to implement braking or to release braking by using the negative pressure by controlling the valves.

For the sake of brevity, the power conversion unit according to the present embodiment is not limited to any structure as long as the power conversion unit is possible to convert the rotational movement of the motor into the linear motion of the hydraulic piston 1320, and the same should be understood in the case of devices of various structures and types.

The foaming liquid pressure supply device 1300 may be hydraulically connected to the reservoir 1100 by a dump controller 1800. The dump controller 1800 may include a first dump controller that controls a flow of pressurizing medium between the first pressure chamber 1330 and the reservoir 1100, and a second dump processor that controls the flow of the pressurizing medium among the second pressure chamber 1340 and the reservoirs 1100. The first dump control unit may include a first dump flow path 1810 that connects the first pressure chamber 1330 and the reservoir 1100, a first bypass flow path 1830 that branches and then re-merges on the first dump path 2010, and the second dump controller may include the second dump flow path 1820 that links the second pressure chamber and the reservoirs 1200 and a second bypass flow path 1840 that branch and subsequently re-joins on a second dump flow path.

A first dump check valve 1811 and a first dump valve 1831 that control the flow of the pressurizing medium may be provided in the first dump flow path 1810 and the first bypass flow path 1830, respectively. The first dump check valve 1811 may be provided to allow only the flow of the pressurizing medium from the reservoir 1100 to the first pressure chamber 1330 and block the flow of the pressurizing medium in the opposite direction A first bypass flow path 1830 may be connected in parallel to the first dump check valve 1811 in the first dump flow path 1810, and a first dump valve 1831 for controlling the flow of the pressurizing medium between the first pressure chamber 1330 and the reservoir 1100 in the first bypass flow path 1830 may be provided. In other words, the first bypass flow path 1830 may bypass and connect the front end and the rear end of the first dump check valve 1811 on the first dump flow path 1810, and the first dump valve 1831 may be provided as a two-way solenoid valve that controls the flow of pressurizing medium between the first pressure chamber 1330 and the reservoir 1100. The first dump valve 1831 may be provided as a normal closed-type solenoid valve that is normally in a closed state and operates to open the valve upon receiving an electrical signal from the electronic control unit.

A second dump check valve 1821 and a second dump valve 2841 that control the flow of the pressurizing medium may be provided in the economizer second dump flow path 220 and the second bypass flow path 1840, respectively. The second dump check valve 1821 may be provided to allow only the flow of the pressurizing medium from the reservoir 1100 to the second pressure chamber 1330 and block the flow of the pressurizing medium in the opposite direction A second bypass flow path 1840 may be connected in parallel to the second dump check valve 1821 in the second dump flow path 1820, and a second dump valve 1841 for controlling the flow of the pressurizing medium between the second pressure chamber 1330 and the reservoir 1100 are connected to the second bypass flow path 1840. In other words, the second bypass flow path 1840 may bypass and connect the front end and the rear end of the second dump check valve 1821 on the second dump flow path 1820, and the second dump valve 1841 may be provided as a two-way solenoid valve that controls the flow of pressurizing medium between the second pressure chamber 1330 and the reservoir 1100. The second dump valve 1841 may be provided as a normal open-type solenoid valve that is normally open and operates to close the valve upon receiving an electrical signal from the electronic control unit.

In addition, the dump control unit 1800 may include an auxiliary inflow path 1850 that connects the reservoir 1100 and the second pressure chamber 1340 so that the pressure medium may be filled into the second temperature chamber 240. The auxiliary inflow path 1850 may be connected to the rear (right side with reference to FIG. 1) of the chamber sealing member 1350*c* on the cylinder body 1310. As a result, the pressurizing medium flows from the reservoir 1100 into the second pressure chamber 1340 through the auxiliary inflow path 1850, and the flow of pressurizing medium that leaks from the first pressure chamber 1330 into the additional inflow path 1840 by the chamber sealing member 1250*c* may be blocked.

The hydraulic control unit 1400 may be arranged to control the hydraulic pressure delivered to each wheel cylinder 20, and the electronic control unit (ECU) is provided to control a hydraulic pressure supply device 1300 and various valves based on hydraulic pressure information and pedal displacement information.

The hydraulic control unit 1400 may include a first hydraulic circuit 1510 for controlling a flow of hydraulic pressure delivered to the first and second wheel cylinders 21, 22, and a second hydraulic circuit for controlling the flow of the hydraulic pressure transferred to the third and fourth wheel cylinders 23, 24, among the four wheel cylinders 20, and includes a plurality of flow paths and valves for controlling hydraulic pressure transmitted from the hydraulic pressure supply device 1300 to the wheel cylinder.

The first hydraulic flow path 1401 may be provided to communicate with the first pressure chamber 1330, and the second hydraulic flow path 2402 may be arranged to communicate therewith. After merging into the third hydraulic flow path 1403, the first and second hydraulic flow paths 1201 and 1302 may be provided so as to be branched again into a fourth hydraulic flow path 2404 connected to the first hydraulic circuit 1510 and a fifth hydraulic flow paths 2505 connected to a second hydraulic circuit.

The sixth hydraulic flow path 1406 is provided so as to communicate with the first hydraulic circuit 1510, and the seventh hydraulic flow path 2407 is provided to communicate therewith. After merging into the eighth hydraulic flow path 1408, the sixth and seventh hydraulic flow paths 1206 and 1307 may be provided so as to be branched again into the ninth hydraulic flow path 2409 communicating with the first pressure chamber 1330 and the tenth hydraulic flow paths 210 communicating with a second pressure chamber 1340.

A first valve 1431 for controlling the flow of the pressurizing medium may be provided in the first hydraulic flow path 1401. The first valve 1431 may be provided as a check valve to allow flow of pressurizing medium from the first pressure chamber 1330, but to shut off flow of the pressurizing medium in the opposite direction. The second hydraulic fluid path 1402 may also be provided with a second valve 1432 for controlling the flow of pressurizing medium, which may be provided as a non-return valve for allowing flow of the pressurizing medium out of the second pressure chamber 1340, but for blocking flow of pressurizing medium in the opposite direction.

The fourth hydraulic flow path 1404 is provided so as to be branched again from the third hydraulic flow paths 1403 where the first and second hydraulic flow paths 1402, 1403 merge and connected to the first hydraulic circuit 1510. A third valve 1433 for controlling the flow of the pressurizing medium may be provided in the fourth hydraulic flow path 1404. The third valve 1433 may be provided as a check valve that allows only the flow of pressurizing medium from the third hydraulic flow path 1403 to the first hydraulic circuit 1510, and blocks the reverse pressurizing medium flow.

The fifth hydraulic flow path 1405 is provided so as to be branched again from the third hydraulic flow paths 1503 where the first and second hydraulic flow paths 1401, 1402 join to each other and connected to the second hydraulic circuit 1520. A fourth valve 1434 for controlling the flow of the pressurizing medium may be provided in the fifth hydraulic flow path 1505. The fourth valve 1434 may be provided as a check valve that allows only the flow of pressurizing medium from the third hydraulic flow path 1303 to the second hydraulic circuit 1520, and blocks the reverse pressurizing medium flow.

The sixth hydraulic flow path 1406 is provided to communicate with the first hydraulic circuit 1510, and the seventh hydraulic flow paths 1407 are provided to connect with the second hydraulic circuit 1520 and to join with the eighth hydraulic flow path 2408. A fifth valve 1435 for controlling the flow of the pressurizing medium may be provided in the sixth hydraulic flow path 1406. The fifth valve 1435 may be provided as a check valve that allows only the flow of pressurizing medium discharged from the first hydraulic circuit 1510, and blocks the reverse pressurizing medium flow. Further, the seventh hydraulic flow path 1407 may be provided with a sixth valve 1436 for controlling the flow of the pressurizing medium. The sixth valve 1436 may be provided as a check valve that allows only the flow of pressurizing medium discharged from the second hydraulic circuit 1520, and blocks the reverse pressurizing medium flow.

The ninth hydraulic flow path 1409 is provided so as to be branched off from the eighth hydraulic flow paths 1408 in which the sixth and seventh hydraulic flow paths 1406, 1407 merge and connected to the first pressure chamber 1330. A seventh valve 1437 for controlling the flow of the pressurizing medium may be provided in the ninth hydraulic flow path 1209. The seventh valve 1437 may be provided as a bi-directional control valve that controls the flow of the pressurizing medium delivered along the ninth hydraulic fluid path 1409. The seventh valve 1437 may be provided as a normal closed-type solenoid valve that is normally in a closed state and that operates to open the valve upon receiving an electrical signal from the electronic control unit.

The tenth hydraulic flow path 1410 is provided so as to be branched off from the eighth hydraulic flow paths 1408 in which the sixth and seventh hydraulic flow paths 1406, 1407 merge and connected to the second pressure chamber 1340. An eighth valve 1438 for controlling the flow of the pressurizing medium may be provided in the tenth hydraulic flow path 1510. The eighth valve 1438 may be provided as a bi-directional control valve that controls the flow of pressurizing medium delivered along the tenth hydraulic fluid path 1410. The eighth valve 1438 may be provided as a normal closed-type solenoid valve that is normally in a closed state and operates to open the valve upon receiving an electrical signal from the electronic control unit, similarly to the seventh valve 1437.

The hydraulic control unit 400 may transmit the hydraulic pressure formed in the first pressure chamber 1330 according to the forward movement of the hydraulic piston 1320 to the first hydraulic circuit 1510 through the first, third, and fourth hydraulic lines 1401, 1403, and 1404, sequentially, and transmit the same to the second hydraulic circuit 1520 through the first and fifth hydraulic lines 1401, 1405. In addition, the hydraulic pressure formed in the second pressure chamber 1340 in response to the backward movement of the hydraulic piston 1320 may be transmitted to the first hydraulic circuit 1510 through the second hydraulic flow path 1402 and the fourth hydraulic flow paths 1404 in sequence, and may be transferred to the second fluid circuit 1520 through the first, third, and fifth hydraulic flow paths 1402, 1403, 1405 in sequence.

As shown in FIG. 1, the negative pressure formed in the first pressure chamber 1330 due to the backward movement of the hydraulic piston 1320 may sequentially recover the pressurizing medium provided to the first hydraulic circuit 1510 to the second pressure chamber 1340 through the sixth hydraulic flow path 11406, the eighth hydraulic flow paths 1208, and the ninth hydraulic flow path 1520. In addition, as the hydraulic piston 1320 advances, the negative pressure formed in the second pressure chamber 1340 may recover the pressurizing medium provided to the first hydraulic circuit 1510 into the first pressure chamber 1330 in sequence through the sixth hydraulic flow path 1406, the eighth hydraulic flow paths 1608, and the tenth hydraulic flow path 1410, and recover the pressurizing medium provided by the second hydraulic circuit 1520 through the seventh hydraulic flow path 1407, the eighth hydraulic flow path 1408, and the tenth hydraulic flow path 1410.

The first hydraulic circuit 1510 of the hydraulic control unit 1400 may control the hydraulic pressures of the first and second wheel cylinders 21, which are two wheel cylinders 20 among the four wheels (RR, RL, FR, FL), and the second hydraulic circuit 1520 may control the hydraulic pressure of the third and fourth wheel cylinders 23, 24, which are the other two wheel cylinders.

The first hydraulic circuit 1510 may receive the hydraulic pressure through the fourth hydraulic flow path 1404, and may discharge the hydraulic fluid through the sixth hydraulic flow path 1406. For this purpose, as shown in FIG. 1, the fourth hydraulic flow path 1404 and the sixth hydraulic flow paths 1406 may be provided so as to be branched into two flow paths that are connected to the first wheel cylinder 21 and the second wheel cylinders 22 after merging. In addition, the second hydraulic circuit 1520 is provided with the hydraulic pressure through the fifth hydraulic flow path 1405, and is capable of discharging the hydraulic fluid through the seventh hydraulic flow paths 1207, and thus, as shown in FIG. 1, may be provided so as to be branched into two flow paths connected to the third wheel cylinder 23 and the fourth wheel cylinders 24 after joining the fifth and seventh hydraulic flow paths 1205 and 1217. However, the connection to the hydraulic fluid shown in FIG. 1 is not limited to this structure as an example to facilitate understanding of the present invention, and the same should be understood when the fourth hydraulic fluid 1404 and the sixth hydraulic fluid are connected to the first hydraulic circuit 1510 side, the first wheel cylinder 21 and the second wheel cylinders 22 are independently branched and connected, and similarly, the fifth and seventh hydraulic fluids 1405, 1407 are connected to the second hydraulic circuit 1520 side, and the third and fourth wheel cylinders 23, 24 are independently branched and connected.

The first and second hydraulic circuits 1510, 1520 may each include first to fourth inlet valves 1511*a*, 1511*b*, 1521*a* and 15212*b* to control the flow and hydraulic pressure of the pressurizing medium delivered to the first to the fourth wheel cylinders 24. The first to fourth inlet valves 1511*a*, 1511*b*, 1521*a* and 1521*b* may each be provided as a normal open-solenoid valve which is arranged on the upstream side of the first to the fourth wheel cylinder 20 and which is normally open and which operates to close the valve upon receiving an electrical signal from the electronic control unit.

The first and second hydraulic circuits 1510, 1520 may include first to fourth check valves 1513*a*, 1513*b*, 1523*a* and 1523*b* that are provided in parallel with respect to the first to the fourth inlet valves 1511*a*, 1511*b*, 1521*a*, 1521*b*. The check valves 1513*a*, 1513*b*, 1523*a*, 1523*b* may be provided in a bypass flow path connecting the front and rear sides of the first to fourth inlet valves 1511*a*, 1511*b*, 1521*a*, 1521*b* on the first and second hydraulic circuits 1510, 1520, allowing only the flow of the pressurizing medium from each wheel cylinder 20 to the hydraulic supply device 1300, and blocking the flow thereof to the hydraulic pressure supply device 1300 from the wheel cylinder 20. The hydraulic pressure of the pressurizing medium applied to each of the wheel cylinders 20 may be quickly extracted by the first to fourth check valves 1513*a*, 1513*b*, 1523*a*, 1523*b* and, even when the first through fourth inlet valves 1511*a*, 1511*b*, 1521*a*, 1521*b* do not operate normally, the hydraulic pressure in the pressurizing medium applied to the wheel cylinder 20 may be smoothly returned to the hydraulic pressure supply unit.

The economizer second hydraulic circuit 1520 may have first and second outlet valves 1522*a*, 1522*b*, which control the flow of pressurizing medium discharged from the third and fourth wheel cylinders 23, 24 for improved performance upon release of the braking of the third and fourth wheel cylinders 23, 24. The first and second outlet valves 1522*a*, 1522*b* are provided on the discharge sides of the third and fourth wheel cylinders 23, 24, respectively, to control the flow of the pressurizing medium delivered from the third or fourth wheel cylinder 23, 24 to the reservoir 100. The first and second outlet valves 1522*a*, 1622*b* may be provided as normal closed-type solenoid valves that operate to open when the outlet valves are normally closed and receive electrical signals from the electronic control unit. In the ABS braking mode of the vehicle, the first and second outlet valves 1522*a*, 1622*b* may selectively release the hydraulic pressure of the pressurizing medium applied to the third wheel cylinder 23 and the fourth wheel cylinder 24, and transmit the same to the reservoir 1100 side.

The first and second wheel cylinders 21, 22 of the first hydraulic circuit 1510 may be branched and connected to a first backup flow path 1610, which will be described later, and at least one first cut valve 1611 may be provided in the first backup flow path 1610 to control the flow of pressurizing medium between the first and second wheel cylinders 21, 22 and the integrated master cylinder 1200.

The electronic brake system 1000 according to an embodiment of the present invention may include first and second backup flow paths 1610, 1620 to directly supply pressurizing medium discharged from the integrated master cylinder 1200 to the wheel cylinder 20 and implement braking when normal operation is not possible due to a failure of the device or the like. The mode in which the hydraulic pressure of the integrated master cylinder 1200 is transmitted directly to the wheel cylinder 20 is referred to as an abnormal operating mode, that is, a fallback mode.

The first backup flow path 1610 may be provided to connect the first master chamber 1220*a* and the first hydraulic circuit 1510 of the integrated master cylinder 1200, and the second backup flow path 1620 may also be provided for connecting the second master chamber 1230*a* and second hydraulic circuit 1520 of the combined master cylinder 1200.

The first backup flow path 1610 may have one end connected to the first master chamber 1220*a* and the other end branched and connected on the first hydraulic circuit 1510 to the downstream side of the first and second inlet valves 1511*a*, 1511*b*, and the second backup flow path 1620 may be connected on one end to the second master chamber 1230*a* and the opposite end connected on a second hydraulic circuit 1520 between the third inlet valve 1521*a* and first outlet valve 1522*a*. Although the second backup flow path 1620 is shown in FIG. 1 as being connected between the third inlet valve 15211*a* and the first outlet valve 1522*a*, it should be understood that the same should be true if the second backup flow path is branched and connected to at least one of the upstream sides of the first and second outlet valves 1522*a*, 1522*b*.

The first backup flow path 1610 may be provided with at least one first cut valve 1611 for controlling the flow of the pressurizing medium in both directions, and the second backup flow path 1620 may be provided with a second cut valve 1621 for controlling flow of a pressurizing medium in both directions. The first cut valve 1611 and the second cut valve 1621 may be provided as a normal open-type solenoid valve which is normally open and which operates to close the valve when the electronic control unit receives a closing signal.

As shown in FIG. 1, a pair of the first cut valves 1611 may be provided on the first and second wheel cylinders 21, 22, respectively, and may selectively release the hydraulic pressure of the pressurizing medium applied to the first wheel cylinder 21 and the second wheel cylinder 22 in the ABS braking mode of the vehicle and discharge the same to the reservoir 1100 side through the first backup flow path 1610, the first master chamber 1220*a*, the second branch flow path 1920 described later, and the dump controller 1800. Details thereof will be described later.

When closing the first and second cut valves 1611, 1621, it is possible to prevent the pressurizing medium of the integrated master cylinder 1200 from being directly transferred to the wheel cylinder 20 and also prevent the hydraulic pressure provided by the hydraulic pressure supply device 1300 from leaking to the integrated master cylinder 1200. Furthermore, when the first and second cut valves 1611, 1621 are open, the pressurizing medium pressurized in the integrated master cylinder 1200 may be supplied directly to the side of the first hydraulic circuit 1510, 1520 through the first and second backup flow paths 1610, 1620 to implement braking.

The inspection flow path 1900 is provided to connect the integrated master cylinder 1200 and the hydraulic pressure supply device 1300, and is provided so as to inspect whether or not the simulator valve 1711 leaks from various component elements attached to the integrated master cylinder 1200.

The inspection flow path 1900 may have one end connected to the second pressure chamber 1340, and the other end branched to the first branch flow path 1910 and the second branch flow path 1920, and may be connected to each of the first master chambers 1220*a* through the third hydraulic pressure port 1280*c* and fourth hydraulic pressure port 1280*d*. One end of the inspection flow path 1900 may be directly connected to the second pressure chamber 1340 or, as shown in FIG. 1, may be connected through a second dump flow path, 1820, to the first pressure chamber.

The first branch flow path 1910 may be provided with an inspection valve 1911 for controlling the flow of the pressurizing medium in both directions between the first master chamber 1220*a* and the second pressure chamber 1340, and the second branch flow path 1920 may include an inspection check valve 1921 for allowing only a flow of a pressurizing medium from the first master chamber 1220 to the second pressure chamber 1340 and blocking the flow thereof in the opposite direction. The inspection valve 1911 may be provided as a normal open-type solenoid valve which is normally open and which operates to close the valve upon receiving an electrical signal from the electronic control unit. The inspection valve 1911 may be controlled in a closed state in a first inspection mode of the electronic brake system 1000 and in an open state in the second inspection mode.

The electronic brake system 1000 may include a circuit pressure sensor PS1 for sensing a hydraulic pressure of a pressurizing medium provided by the hydraulic pressure supply device 1300, and a cylinder pressure sensors PS2 for sensing hydraulic pressure in the second master chamber 1230*a*. The circuit pressure sensor PS1 is provided on the side of the first hydraulic circuit 1510, so as to sense the hydraulic pressure of the pressurizing medium generated and provided from the hydraulic supply device 1300 in the inspection mode and transmitted thereto, and the cylinder pressure sensors PS2 are provided between the second master chamber 1230*a* and the second cut valve 1621 on the second backup flow path 1620 and sense the hydraulic pressure of a pressurizing medium received in the first master chamber. In the first inspection mode described later, the pressure value information of the pressurizing medium sensed by the circuit pressure sensor PS1 and the cylinder pressure sensor PS2 may be sent to the electronic control unit, which compares the hydraulic pressure value sensed by a circuit pressure sensors PS1 with the hydraulic water value sensed in the cylinder pressures sensor PS2 to determine whether the integrated master cylinder 200 or the simulator valve 1711 leaks. The electronic brake system 1000 may also include a stroke sensor (not shown) that measures a displacement amount of the hydraulic piston 1320 of the hydraulic pressure supply device 1300, and the stroke sensor may inspect a leak in the integrated master cylinder 1200 based on the displacement amount information of the hydraulic piston 1320 in a second inspection mode described below.

The electronic brake system 1000 according to an embodiment of the present invention provided as described above may include an inspection mode for inspecting whether the integrated master cylinder 1200 and the simulator valve 1711 leak, a normal operation mode for performing braking by operating normally without failure or abnormality of various component elements, and an abnormal operation mode (fallback mode) for performing vehicle braking urgently in a state where failure or failure of the brake system occurs.

Hereinafter, a normal operation mode of the electronic brake system 1000 according to an embodiment of the present invention will be described.

The normal operation mode of the electronic brake system 1000 according to an embodiment of the present invention may operate in a different manner from the first braking mode to the third braking mode as the hydraulic pressure transmitted from the hydraulic supply device 1300 to the wheel cylinder 20 increases. Specifically, the first braking mode may provide the hydraulic pressure by the hydraulic power supply 1300 to the wheel cylinder 20 primarily, the second braking mode provides the hydraulic fluid by the hydraulic pressure supply device 1300 secondarily to the wheels cylinder 20 to transmit the brake pressure higher than that in the first brake mode, and the third braking mode thirdly provides the liquid pressure by means of the fluid-pressure supply device 1300 to be transmitted the brake pressures higher than those in the second brake mode.

The first braking mode to the third braking mode may be changed by changing the operations of the hydraulic pressure supply device 1300 and the hydraulic control unit 1400. By utilizing the first to third braking modes, the hydraulic pressure supply device 1300 may provide a sufficiently high hydraulic pressure of the pressurizing medium without a high-specification motor, and may further prevent unnecessary load applied to the motor. As a result, a stable braking force may be ensured while reducing the cost and weight of the brake system, and durability and operation reliability of the device may be improved.

Figure 2:
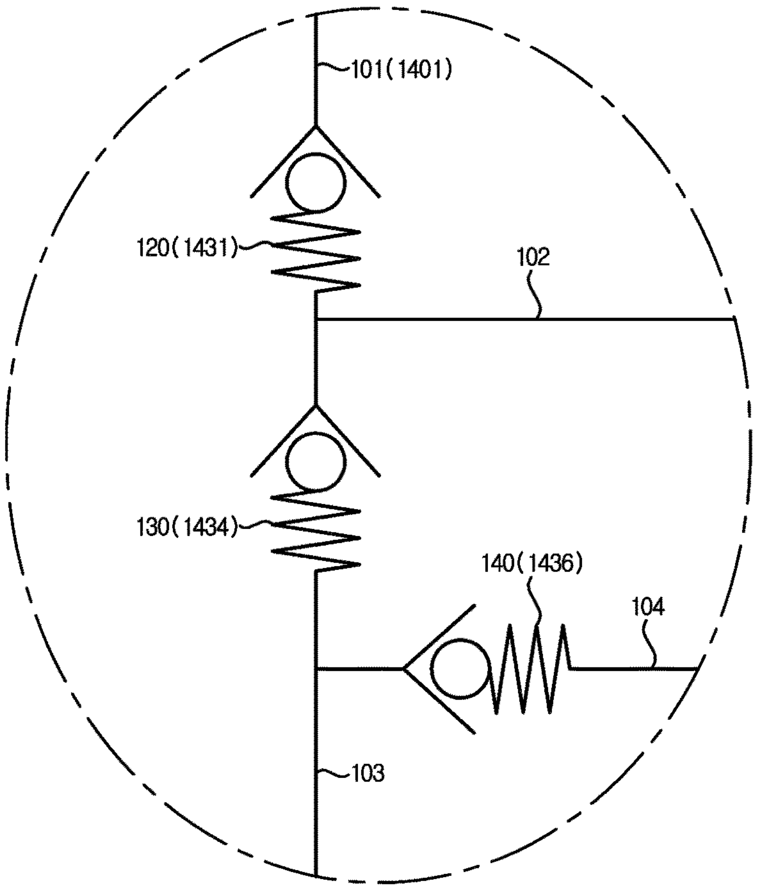
FIG. 2 is a schematic enlarged cross-sectional view showing a part of a flow path of a brake system of a vehicle in which a check valve according to a first embodiment of the present invention is used.
Figure 3:
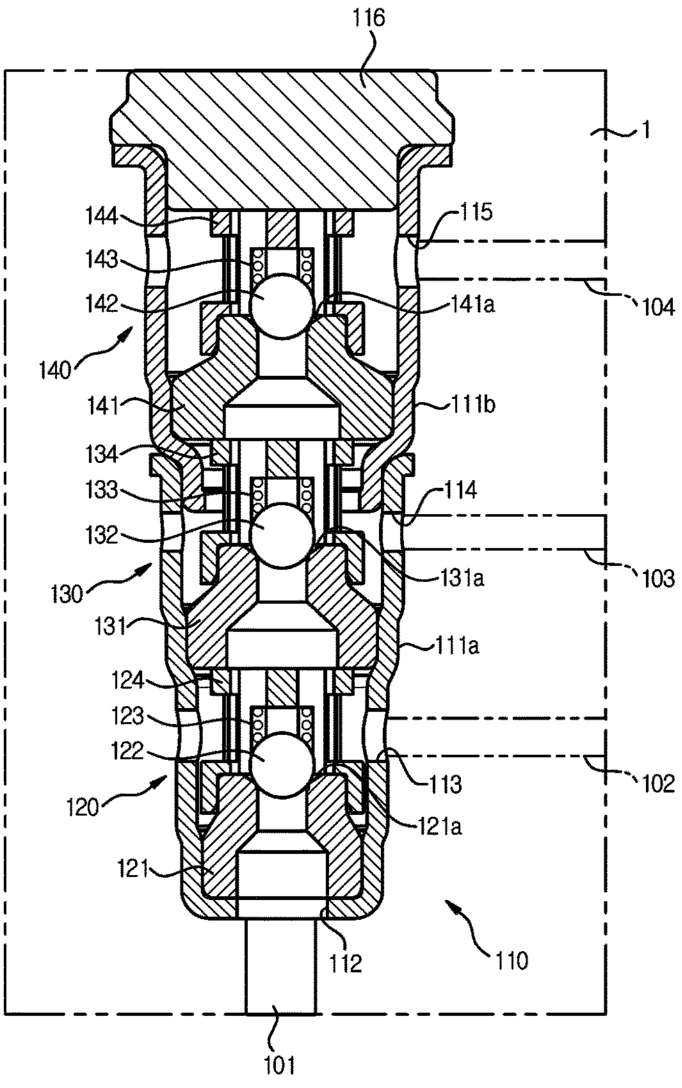
FIG. 3 is a sectional view showing a check valve according to a first embodiment of the present invention.

FIG. 2 is a hydraulic circuit diagram schematically showing a part of the hydraulic control unit of FIG. 1 in which the check valve according to the first embodiment of the present invention is installed. For ease of description, each of the flow paths (e.g., 1401, 1403, 1405, and 1407) and the valves 1431, 1434, 1436 may be hereinafter referred to as flow paths 101-104 and valves 120, 130, or 140. FIG. 3 is a cross-sectional view showing a specific state in which the check valve of FIGS. 2A and 2B is provided in the valve mounting hole of the modulator block.

Since the check valve according to the present embodiment is formed by stacking a plurality of valve parts in a line as illustrated, the check valve may be easily installed in one valve mounting hole provided in a modulator block by replacing the conventional three one-way check valves provided independently on the plurality of flow paths 101-104 provided in the modulator block 1. As a result, it is possible to eliminate the shortage of installation space and to reduce the number of parts due to a simple structure, thereby reducing manufacturing costs and assembly processes.

Figure 4:
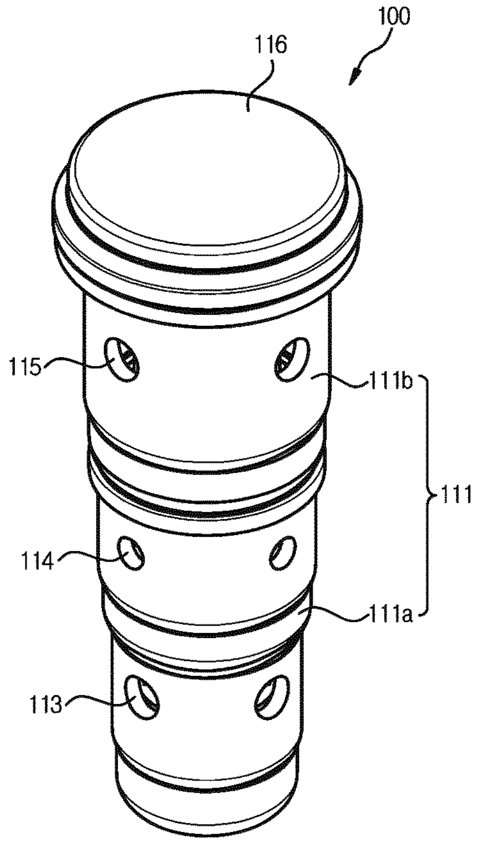
FIG. 4 is combined perspective view showing a check valve according to a first embodiment of the present invention.
Figure 5:
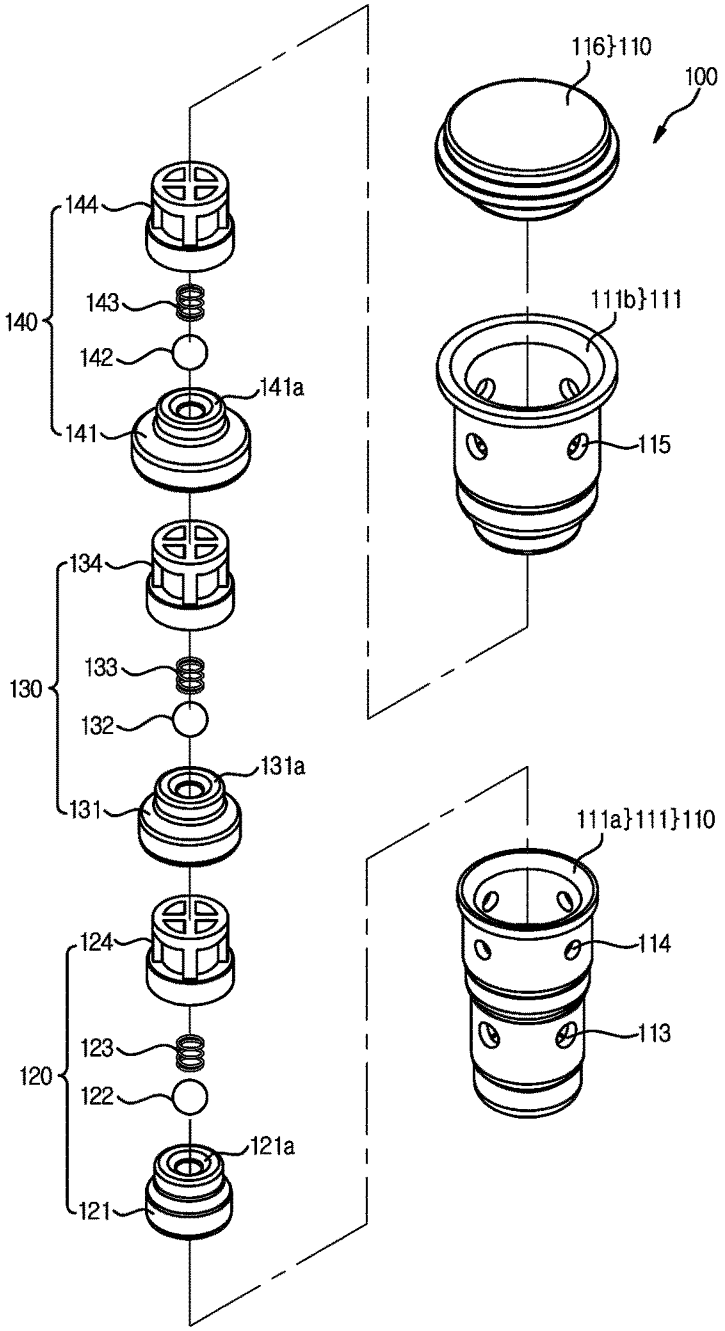
FIG. 5 is an exploded perspective view showing a check valve according to a first embodiment of the present invention.

FIG. 4 is a combined perspective view showing the check valve according to the first embodiment of the present invention, and FIG. 5 is an exploded perspective view showing a check valve according to a first embodiment of the present invention.

As shown in FIGS. 3 to 5, the check valve 100 according to the first embodiment may include a valve housing 110 having therein a flow path passing through the inside and the outside, and a plurality of valve parts 120, 130, and 140 provided on the flow paths of the valve housing. Hereinafter, for convenience of description, in the present embodiment, the plurality of valve parts are illustrated as three valve parts including the first valve part 120, the second valve parts 130, and the third valve 140, but the present invention is not limited thereto and may include at least two or more valve parts.

The valve housing 110 may include a housing body 111 that is provided in a cylindrical shape with one side open, and a housing cap 116 that is engaged with the opening of the housing body 111.

The housing body 111 is made of a metal material, and the outer and inner shapes of the body may be machined in a forging or other manner to facilitate machining. According to the present embodiment, the housing body 111 may include a first body 111*a* and a second body 111*b*.

The first body 111*a* is provided in a cup shape with an opening on one side, and the second body 111*b* is provided with openings on both sides, so that one side of the open sides of the second body 111*b* is assembled on the open one side of the first body 111*a*. A housing cap 116 is assembled on the other side of the second body 111B. Thus, the housing body 111 may have a generally cylindrical shape. The ends of the first body 111*a* and the second body 111*b* that are assembled together in the longitudinal direction may be firmly joined in such a way as to be press-fitted or cocked.

Further, the side wall of the cup-shaped housing body 111 may be stepped along the longitudinal direction. This is to allow the plurality of valve parts 120, 130, 140 described above to be seated in the correct position when assembled in the valve housing 110, while allowing the plurality of valve parts 120, 130, 140 to be easily assembled sequentially in the housing body 111. For example, the plurality of valve parts 120, 130, 140 may be arranged to sequentially increase in size along the direction of the open end from the closed bottom of the housing body 111 for ease of assembly as shown.

The housing body 111 has, on a bottom surface of one end thereof, a first body hole 112 for communicating the inside and the outside of the valve housing 110, and may have, at a predetermined interval along a longitudinal direction of a side wall, a second body hole, a third body hole and a fourth body hole that communicate the inside with the outside thereof. Here, the first body hole 112 is provided in the longitudinal direction of the housing body 1 and the second, third, and fourth body holes 113, 114, and 115 are provided in a circumferential direction of a housing body 111, but the present invention is not limited thereto. A plurality of second, third, and fourth body holes 113, 114, and 115 may be provided at predetermined intervals along the circumferential direction of the housing body 111.

The valve housing 110 provided as described above is firmly and closely engaged with a flow path (valve mounting hole) in the shape of a bore formed in the modulator block. In other words, as shown in FIG. 3, the first body hole 112 of the housing body 111 communicates with the first flow path 101 of the modulator block 1, the second body hole 113 communicate with the second flow path 102, the third body hole 114 communicates with the third flow path 103, and the fourth body hole 115 is communicated with the fourth flow path 104.

According to the present embodiment, the plurality of valve parts 120, 130, 140 may include the first valve part 120, the second valve part 130, and the third valve part 140.

The first valve part 120 may be provided between the first flow path 101 and the second flow path 102. Specifically, an opening/closing member (e.g., a ball) for selectively opening/closing the flow path in the valve part may be provided in a valve housing 111 so as to be located between at least two adjacent body holes, for example, a first body hole 112 communicating with the first flow path 101 and a second body hole 113 communicating with the second flow path.

The first valve part 120 may include a first valve seat 121 in which an orifice through which fluid passes is formed, a first ball 122 as an opening/closing member which is selectively in contact with the orifice, a coil spring-like first elastic member 123 which is elastically supported on one side by pressure on the first ball 122, and a first filter cap 124 which is engaged with the first valve seat 121 to receive the first ball 122 and is elastically supported on the other side of the first elastic member 123.

The first ball 122 is provided so as to be able to selectively contact the inclined first valve surface 121*a* of the first valve seat 121, the first elastic member 123 is provided to be capable of pressing the first ball 122 to the side of the second valve surface 141*a*, and the first filter cap 104 elastically presses and supports the first elastic member 123. The first filter cap 124 may support the first elastic member 123, and may also function as a spacer for filtering incoming foreign matter and maintaining a distance from other adjacent valve parts. Here, in the present embodiment, the ball is exemplified as an opening/closing member for selectively opening/closing the orifice, but the present invention is not limited thereto, and may be provided in various other forms such as a semicircle and an arc. When a ball is adopted, the first valve part 120 may be referred to as a first ball valve part.

The first valve part 120 forms one independent valve part together with the valve housing 111 by having the first valve seat 121 seated on the bottom surface and the stepped inner wall of the valve housing 111 and the first filter cap 124 engaged with the first valve seat 121 through the first ball 122 and first elastic member 123.

The first valve part 120 provided as described above allows the fluid to move from the outside to the inside of the housing body 111 (or from the first body hole 112 to the second body hole 113) of the valve housing 10 when the hydraulic pressure of the fluid is greater than the elastic force of the first elastic member 123, but prevents the fluid from moving. Therefore, in the first embodiment, when only the first flow path 101 is used as the inlet flow path of the fluid, the second flow path 102, the third flow path 103, and the fourth flow path [104] may be used as outlet flow paths of the fluids, respectively. In addition, when the first, second, and third valve parts 120, 130, 140 having a one-way flow are provided in the housing body 111 so as to pass the fluid in the same direction as in the present embodiment, if the first to third flow paths 101-103 are each used as an independent inlet flow path, the fourth flow path may be used as a common outlet flow path.

Meanwhile, the second valve part 130 may be provided between the second flow path 102 and the third flow path 103, and may be specifically provided in the valve housing 111 between a second body hole 113 communicating with a second flow path 120 and a third bod hole 114 communicating with a third flow path 103.

The second valve part 130 may include a second valve seat 131 having an orifice formed therein, a second ball 132 as an opening/closing member that selectively contacts the orifice, a third elastic member 133 in the shape of a coil spring that is elastically supported on one side by the second ball 132, and a second filter cap 134 that is engaged with the second valve seat 131 and is elastically supported on the other side of the second elastic member 132.

The second ball 132 is provided so as to be able to selectively contact the inclined second valve surface 131*a* of the second valve seat 113, the second elastic member 132 may be provided so as to press the second ball 132 toward the first valve surface 131*a*, and the second filter cap 154 elastically presses and supports the second elastic member 132. The second filter cap 134 may support the second elastic member 132, and may also function as a spacer for filtering incoming foreign matter and maintaining a distance from other adjacent valve parts. Here, in the present embodiment, the ball is exemplified as a member for selectively opening/closing the orifice, but the present invention is not limited thereto and may be provided in various other forms such as a semi-circle and an arc. When a ball is adopted, the second valve part 130 may be referred to as a second ball valve part.

The second valve part 130 forms one independent valve part together with the valve housing 111 by the second valve seat 131 being seated on a stepped surface formed in the middle of the valve housing 111 and the second filter cap 134 being engaged with the second valve seat 131 through the second ball 132 and second elastic member 133. At this time, the second valve seat 131 of the first valve part 120 may be supported in contact with the first filter cap 124 thereof.

The second valve part 130 provided as described above allows the fluid inside the valve housing 110 to move from the second body hole 113 to the third body hole 114 when the hydraulic pressure of the fluid is greater than the elastic force of the second elastic member 132, but prevents the fluid from moving. Therefore, in the first embodiment, when the second flow path 102 is used as the inlet flow path of the fluid together with the first flow path 101, the third flow path and the fourth flow path may be used respectively or together as the outlet flow path for the fluid. When the first, second, and third valve parts 120, 130, 140 having one-way flow are disposed in the housing body 111 in the same direction as in the present embodiment, the fourth flow path 104 may be used as a common outlet flow path if the first flow path to the third flow path are used as independent inlet flow paths. In other words, when the hydraulic pressure of the fluid flowing through the first flow path 101 is greater than the elastic force of the elastic members 123, 133, and 143 of the valve part, the fluid that has passed the first valve part 120 may be transmitted to the second valve part 130 and the third valve parts 140.

In short, the third valve part 140 may be provided between the third flow path 103 and the fourth flow path 104, and specifically, is provided in the valve housing 111, specifically, the second body 111*b*, between a third body hole 114 communicating with the third fluid path 103 and a fourth body hole 115 communicating therewith.

The third valve part 140 may include a third valve seat 41 having an orifice formed therein, a third ball 142 as an opening/closing member selectively in contact with the orifice, a fourth elastic member 143 in the shape of a coil spring which is elastically supported on one side by the third ball 142, and a third filter cap 144 which is engaged with the third valve seat 141 and is elastically supported on the other side of the third Mastic member 144.

The third ball 142 is provided so as to be selectively in contact with the inclined third valve surface 121*a* of the third valve seat 131, the third elastic member 143 is configured to be able to press the third ball 142 toward the third valves surface 141*a*, and the third filter cap 144 elastically presses and supports the third elastic member 143. The third filter cap 144 may support the third elastic member 143, and may also function as a spacer for filtering incoming foreign matter and maintaining a distance from other adjacent valve parts. Here, in the present embodiment, the ball is exemplified as a member for selectively opening/closing the orifice, but e present invention is not limited thereto and may be provided in various other forms such as a semi-circle and an arc. When a ball is adopted, the third valve part 140 may be referred to as a third ball valve part.

The third valve part forms one independent valve part together with the valve housing 111 by the third valve seat 141 being seated on a stepped surface formed on the bottom side of the second body 111*b* of the valve housing 111 and the third filter cap 144 being engaged with the third valve seat 141 through the third ball 142 and the third elastic member 143 that are interposed. At this time, the third valve seat 141 of the second valve part 130 may be supported on one side by being in contact with the second filter cap 134 and on the other side by contacting the housing cap 116.

The third valve part 140, which is provided as described above, allows the fluid passing through the orifice of the third valve part 140 to move from the third body hole 114 to the fourth body hole 115, but prevents the fluid from moving, when the hydraulic pressure of the fluid flowing in is greater than the elastic force of the second elastic member 132. Therefore, in the present first embodiment, when the third flow path 103 is used as an inlet flow path for fluid together with flow path and the second flow path, the fourth flow path may be used as the outlet flow path of the fluid. That is, when the first, second, and third valve parts 120, 130, 140 having a one-way flow are disposed in the housing body 111 in the same direction as in the present embodiment, the fourth flow path 104 may be used as a common outlet flow path if the first flow path to the third flow path are used as independent inlet flow paths. In other words, when the hydraulic pressure of the fluid flowing through the first flow path 101 is greater than the elastic force of the first elastic member 123 of the first valve part 120 and when the hydraulic pressure of fluid that flows through the second flow path 102 is greater than the spring force of the second elastic member 132 of the second valve part 130, the fluid that has passed the first valve part 120 is transmitted to the second valves 140.

Accordingly, in the check valve 100 according to the first embodiment, when fluid flows into the interior of the modulator block through the first flow path 101 to which the first valve part 120 is connected, the second flow path 102 to each of which the second valve part 130 is connected and the third flow path 103 to which the third valve part 140 is connected among the plurality of flow paths 101-104 of the hydraulic control unit provided in the modulator block, it is possible to discharge the fluid to the exterior of the modulator block through the fourth flow path 104. In addition, when only one first valve part 120 is provided in the modulator block, the first flow path 101 may be used as an inlet flow path and the second flow path 102 may be use as an outlet flow path, and when only two valve parts (the first valve part 120 and the second valve part 130) are provided in a modulator block, the first and second flow paths 101, 102 may also be used for common outlet flow paths.

Figure 6:
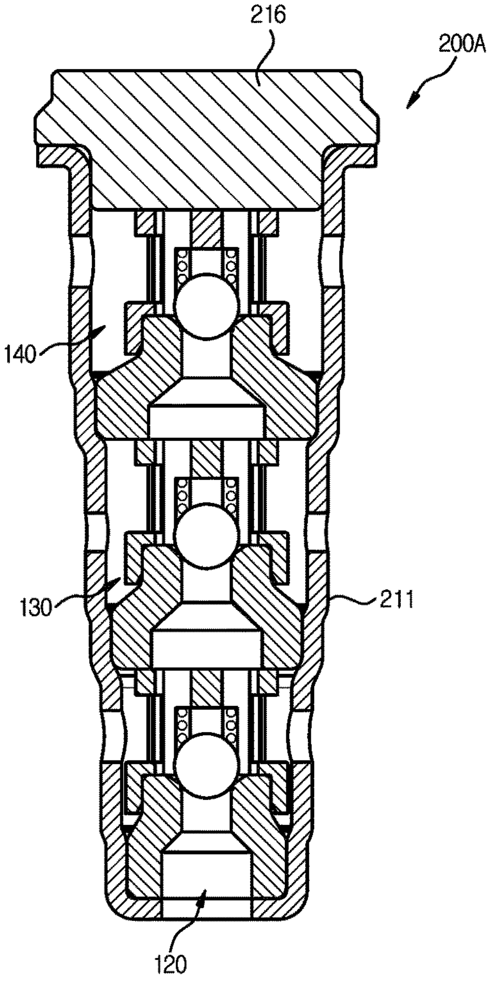
FIG. 6 is a combined sectional view showing a check valve according to a (2-1)th embodiment of the present invention.

FIG. 6 is a combined sectional view showing a check valve according to (2-1)th embodiment of the present invention. The check valve 200A according to the (2-1)th embodiment will be described mainly in terms of differences from the check valves 100 of the above-described first embodiment, and the same reference numerals as in the first embodiment perform the same functions, and detailed description thereof will be omitted.

In the check valve 200A according to the (2-1)th embodiment, unlike the first embodiment, the cylinder-shaped housing body 211 open on one side is provided integrally without being separated into two, and it is the same that a stepped portion is formed on the side wall along the longitudinal direction and the open end is engaged with the housing cap 216. In addition, the sizes of the plurality of valve parts 120, 130, 140 sequentially increase along an end direction open from the bottom of the housing body 211.

Accordingly, the housing body 211 is an integrated check valve 200A in which the first valve part 120, the second valve part 130, and the third valve part 140 are sequentially seated inside, and then the first, second, and third valve parts 120, 130, 140 are stacked in a line on one housing body 211 while being hermetically assembled with the housing cap 216.

Figure 7:
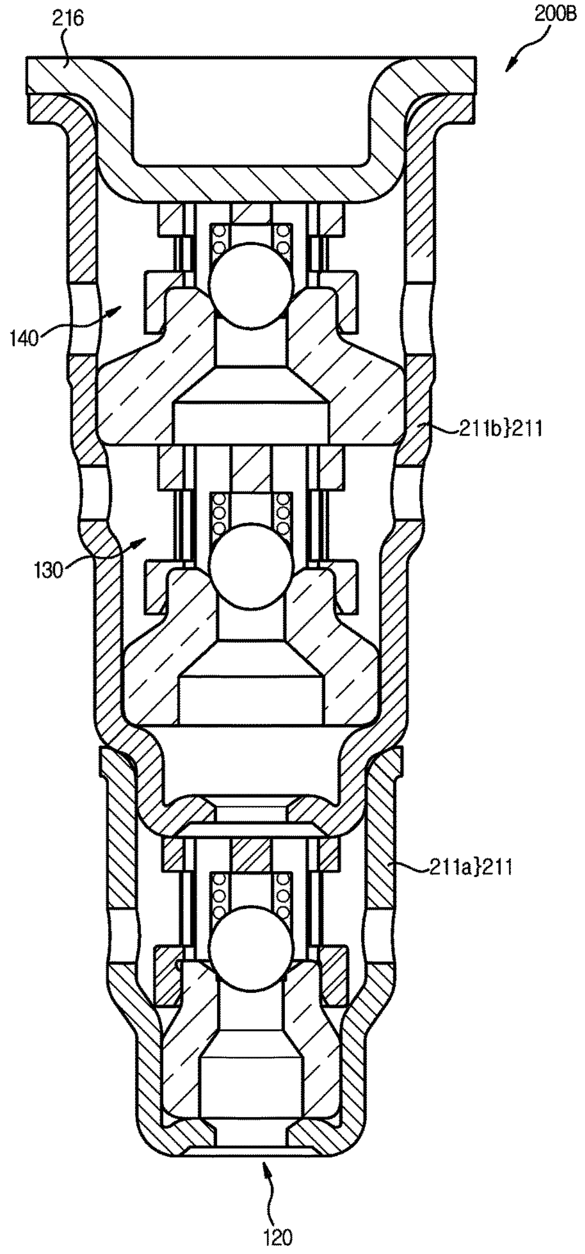
FIG. 7 is a combined sectional view showing a check valve according to a (2-2)th embodiment of the present invention.

FIG. 7 is a combined sectional view showing a check valve according to (2-2)th embodiment of the present invention. The check valve 200B according to the (2-2)th embodiment will be described mainly in terms of differences from the check valve of the first embodiment, and the same reference numerals as those in the 1st embodiment perform the same functions, and detailed description thereof will be omitted.

In the check valve 200B according to the (2-2)th embodiment, the housing body 211 in the shape of a cylinder open on one side is separated into the first body 111*a* and the second body 311*b* in the same manner as in the first embodiment, and at least one valve part is provided in each of the bodies 101*a*, 101*b*. Specifically, one valve part 120 is provided in the first body 211*a* on the lower side in the longitudinal direction, and two valve parts 130, 140 are provided in a second body 211*b* on the upper side. In addition, a step is formed in the side wall of the housing body 211 along the longitudinal direction, and the housing cap 216 is engaged with the end of the open housing body 211. In addition, the sizes of the plurality of valve parts 120, 130, 140 sequentially increase along an end direction open from the bottom of the housing body 211.

Accordingly, the housing body 211 is an integrated check valve 200B in which the first, second, and third valve parts 120, 130, 140 are sequentially seated and then hermetically assembled with the housing cap 116, with the first, second, and third valves 120, 130, 140 disposed in a line on one housing body 211.

The check valve 200B provided as described above is relatively excellent in product stability because the check valve 200B is less deformed against the pressure applied when the modulator block is assembled, as compared with the check valve 100 of the first embodiment.

Figure 8:
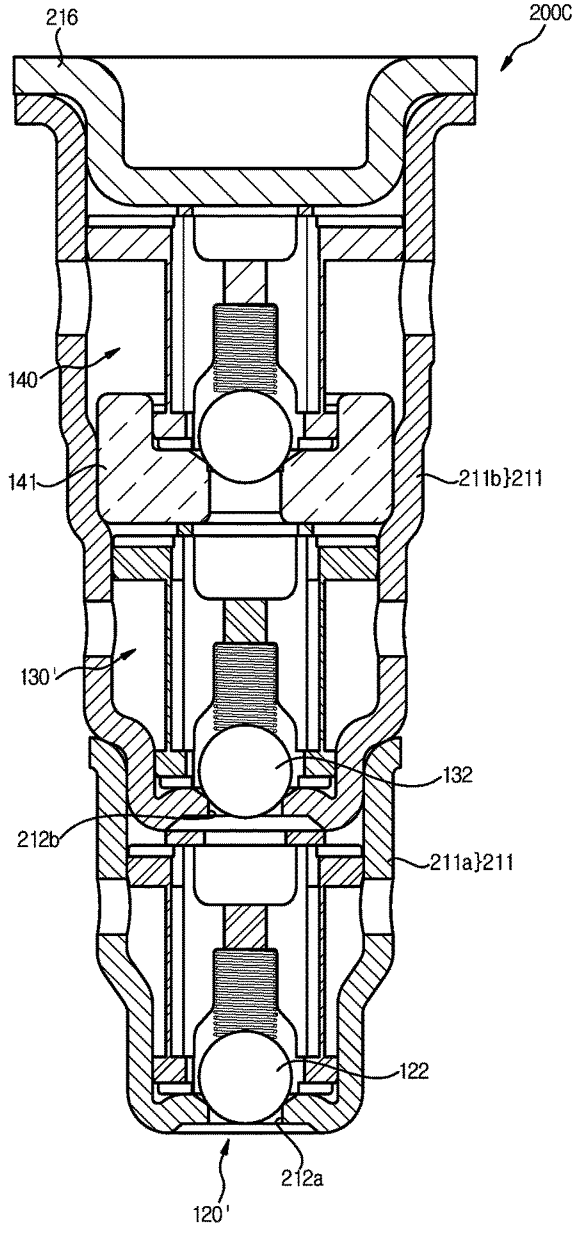
FIG. 8 is a combined sectional view showing a check valve according to a (2-3)th embodiment of the present invention.

FIG. 8 is a combined sectional view showing a check valve according to a (2-3)th embodiment of the present invention. The check valve 2000 according to the present (2-3)th embodiment will be described focusing on the difference from the above-described check valve 200B in a (2-2)th embodiment, and the same reference numerals as those of the second to second embodiment perform the same functions, and detailed description thereof will be omitted.

In the check valve 200C according to the (2-3)th embodiment, the housing body 211 in the shape of a cylinder open on one side is separately provided as the first body 211*a* and the second body 211*b*, and at least one valve part is provided in each of the bodies 121*a*, 211*b*. Specifically, one valve part 120' is provided in the lower first body 211*a* in the longitudinal direction, and two valve parts 130', 140 are provided in an upper second body 211*b*. In addition, a step is formed in the side wall of the housing body 211 along the longitudinal direction, and the housing cap 216 is engaged with the end of the open housing body 211. In addition, the sizes of the plurality of valve parts 120', 130', 140 sequentially increase along an end direction open from the bottom of the housing body 211.

Accordingly, the housing body 211 is an integral check valve 200C in which the first, second, and third valve parts 120', 130', 140 are sequentially seated and then hermetically assembled by the housing cap 116, with the first, second, and third valve parts 120', 130', 140 stacked in a line on one housing body.

Here, in the check valve 200C according to the (2-3)th embodiment, the first valve part 120' and the second valve parts 130' are each free of a valve seat, and only the third valve part 140 has the valve seat 141. That is, the first valve part 120' and the second valve parts 130' function as orifices for selectively opening/closing the first and second body holes 212*a* and 212*b*, respectively, provided in the first body 211*a* and the second body 211*b* of the housing body 211, in direct contact with the first ball 122 and the second ball 132, which are opening/closing members.

Accordingly, the check valve 200C provided as described above may further simplify the structure by reducing the number of components as compared with the check valves 200B of the (2-2)th embodiment.

Figure 9:
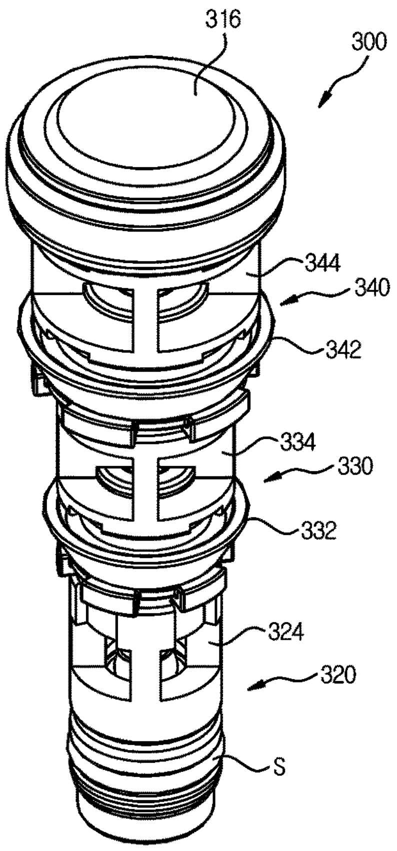
FIG. 9 is a combined perspective view showing a check valve according to a third embodiment of the present invention.
Figure 10:
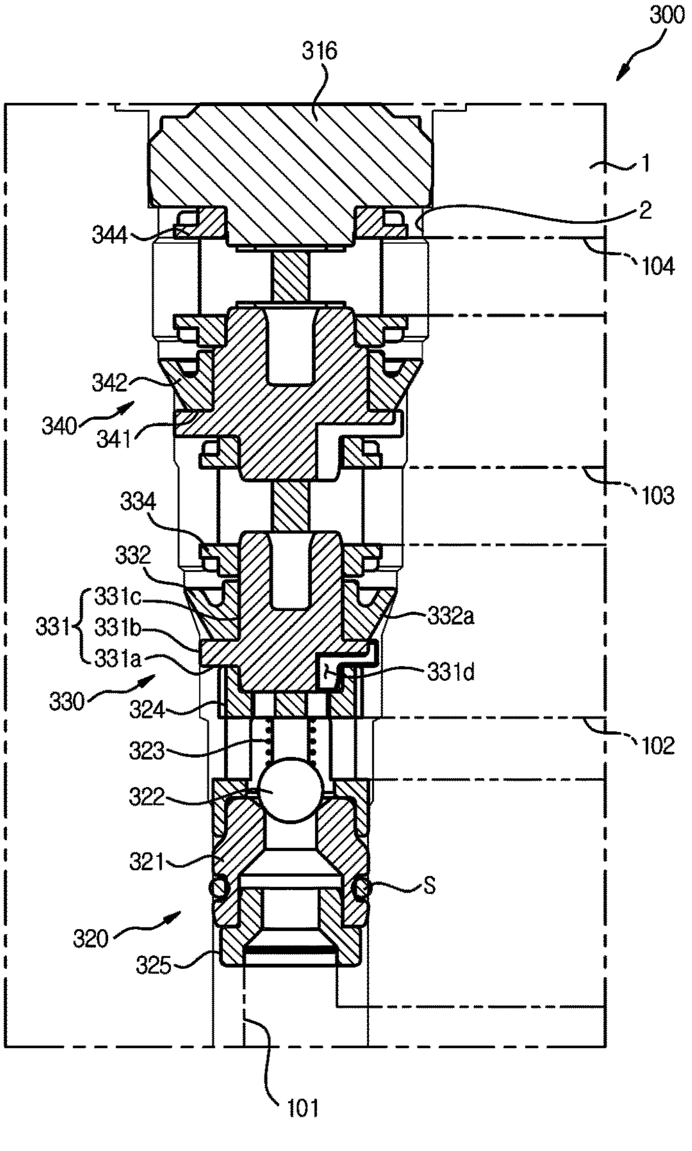
FIG. 10 is a combined sectional view showing a check valve according to a third embodiment of the present invention.

FIGS. 9 and 10 are an engagement perspective view of a check valve according to a third embodiment of the present invention and a sectional view showing a modulator block with which the check valve is engaged. The check valve 300 according to the third embodiment will be described mainly in terms of differences from the check valves 100, 200A-200C of the above-described first and second embodiments, and the same reference numerals as in the first and the second embodiments perform the same functions, and detailed description thereof will be omitted.

The check valve 300 according to the present embodiment may be integrated by stacking the first valve part 320, the second valve part 330, and the third valve unit 340 and the housing cap 316 in a line without a valve housing, and thus the check valve in which a plurality of valve units are integrated may be simply engaged with the bore (valve mounting groove) provided in the modulator block 1.

For example, as shown in FIGS. 9 and 10, in the check valve 300 of this embodiment, a second valve seat 331 of the second valve part 330 adjacent to the first filter cap 324 of the first valve part 320 may be fastened by an engaging method such as forced press-fitting or rotation jamming, the third valve seat 341 of the third valve part 340 adjacent to the second filter cap 334 of the second valve part 330 may be fastened by an engaging method such as forced press-fitting or rotation jamming, the housing cap 316 may be finally fastened to the third filter cap 344 of the third valve unit 340 by an engaging method such as forced press-fitting or rotational engagement.

In addition, in the third embodiment, the first valve part 320 may employ a ball-seat type using balls as the flow path opening/closing member as described above, but the second and third valve parts 330 and 340 may adopt type using a lip seal as well as a ball seat type as the opening/closing member of the flow path.

Specifically, as shown in FIG. 10, a second lip seal 332 serving as an opening/closing member provided in the second valve part 330 may be provided between the second valve seat 331 and the second filter cap 334.

The second valve seat 331 is provided in a cylindrical shape and may include a small-diameter head 331*a*, a large-diameter flange 331*b*, and a smaller-diameter valve body 331*c*. The hollow second lip seal 332 is engaged with the valve body 331*c* of the second valve seat 331.

As a result, the second lip seal 332 is fixed in position in the front-rear direction of the fluid flow while being supported on both sides by the flange 331*b* of the second valve seat 331 and the second filter cap 334.

In addition, the second lip seal 332 may have a second lip sealing surface 332*a* in the shape of an inclined surface with an outer diameter extending from the upstream side to the downstream side in the fluid flow direction to allow movement of fluid while being selectively contacted by hydraulic pressure with the inner surface of the bore 2 provided in the modulator block 1. For reference, an undescribed reference numeral 331*d* denotes a valve flow path provided in the shape of a groove between the head 331*a* and the flange 331*b* of the second valve seat 331.

Similarly to the second valve part 330, the third valve part 340 is also provided with a third valve seat 341 having a head, a flange, a valve body and a valve flow path, a third lip seal 342, and a third filter cap 344, and each member operates in the same manner as the second valve part 330 except for the diameter thereof, and thus a detailed description thereof is omitted.

Accordingly, the check valve 300 according to the third embodiment is inserted and fixed in the bore 2 of the modulator block 1, as shown in FIG. 10, so that the plurality of flow paths 101 to 104, the first valve part 320, the second valve part 330, and the third valve part 340 selectively communicate with each other. As a result, fluid that has flowed into the modulator block 1 independently through at least one inlet flow path of the plurality of flow paths 101-104 may be discharged to the outside of the modulator block 1 through another outlet flow path.

Figure 11:
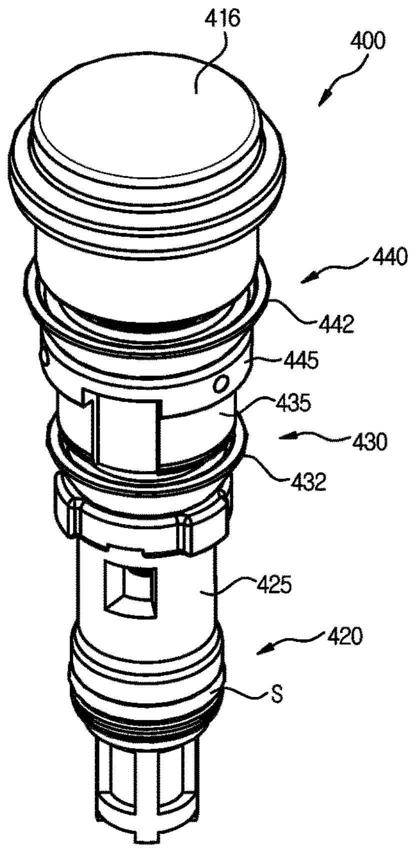
FIG. 11 is a combined perspective view showing a check valve according to a fourth embodiment of the present invention.
Figure 12:
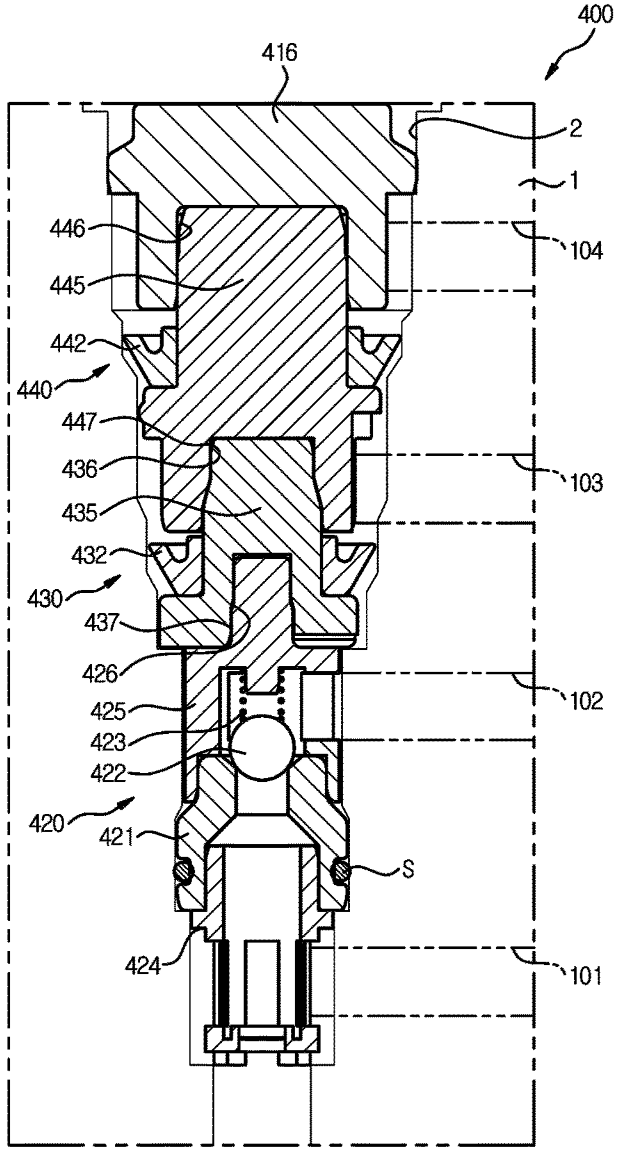
FIG. 12 is a combined sectional view showing a check valve according to a fourth embodiment of the present invention.

FIGS. 11 and 12 are a combined perspective view of a check valve according to a fourth embodiment of the present invention and a sectional view showing a modulator block with which the check valve is engaged. The check valve 400 according to the fourth embodiment will be described focusing on the difference from the check valve 300 of the third embodiment, and the same reference numerals as in the first, second, and third embodiments perform the same functions, and detailed description thereof will be omitted.

The check valve 400 according to the fourth embodiment has a simpler form than the check valve 300 of the third embodiment, and the second valve part 430 and the third valve part 440 include the valve blocks 435, 445 and the lip seals 432, 442, and no filter cap is provided.

In addition, in the check valve 400 of the present embodiment, as shown in FIGS. 11 and 12, the first valve part 420 has a ball-seat structure, and the second valve part 430 and the third valve part 440 have a lip-seal structure.

The first valve part 420 includes the first valve seat 421, the first ball 422, and the first elastic member 423 as described above. However, the first ball 422 and the first elastic member 423 are supported by the first valve block 425 which is engaged with the second valve seat 421. In other words, the first valve block 425 has a front end engaged with the second valve seat 421 and a rear end engaged with the second valve block 435 through the first block protrusion 426. In the present embodiment, the first filter member 424 is provided in front of the fluid flow of the first valve seat 421, and the undescribed reference numeral s denotes a seal member provided in the first valve seat 421.

The second valve part 430 includes a second lip seal 432 and a second valve block 435. The second valve block 435 includes a second block head groove 437 with which the first block protrusion 426 of the first valve part 420 is engaged in front of the fluid flow, and the second lip seal 432 is engaged with the second block protrusion 436 provided behind the fluid flow of the second valve body 435. The second lip seal 432 may be supported on both sides by a flange of the second valve body 435 and a third valve block 445 of the third valve part 440. The second valve block 435 according to the fourth embodiment is formed integrally with the valve seat of the third embodiment and the filter cap, and may be in the shape of one single member.

The third valve part 440 includes a third lip seal 442 and a third valve block 445. The third valve block 445 includes a third block head groove 447 with which the second block protrusion 436 of the second valve part 410 is engaged in front of the fluid flow, and the third lip seal 442 is engaged with the third block protrusion 446 provided in the rear of the fluid flow of the third valve block 445. The third lip seal 442 may be stably supported on both sides by the flange of the third valve block 445 and the housing cap 416.

Accordingly, the check valve 400 according to the fourth embodiment is inserted into and fixed to the bore 2 of the modulator block 1 as shown in FIG. 12, so that the plurality of flow paths 101-104, the first valve part 420 and the second and third valve parts 430 and 440 may selectively communicate with each other. As a result, fluid that has flowed into the modulator block 1 independently through at least one inlet flow path of the plurality of flow paths 101-104 may be discharged to the outside of the modulator block 1 through another outlet flow path.

Although the embodiments above illustrate a non-return valve configuration in which three integrally formed valve parts, e.g., a first valve part, a second valve part and a third valve part are provided in the same direction of fluid flow in one valve housing or in a bore of a modulator block, the present invention is not limited thereto and may be provided in more various forms through suitable variations and modifications.

In addition, although not shown in detail, the internal flow path of the valve housing and the flow path provided in the bore of the modulator block are parallel to each other as well as may be changed and modified in any suitable form such as "L", "T" or "+".

The invention claimed is:

1. A check valve comprising a plurality of valve parts in which an internal flow path is selectively open/closed by opening/closing members, wherein the plurality of the valve parts are stacked in a line, wherein the opening/closing members provided in at least one of the plurality of valve parts are provided in the shape of a lip seal, wherein at least one valve part of the plurality of valve parts comprises a valve seat comprising a small diameter head, a large diameter flange, and a small diameter valve body; and a filter cap engaged with the valve body, wherein the opening/closing members provided in the shape of the lip seal are fitted into the valve member of the valve seat, are positioned between the flange and the filter cap and comprise a lip sealing surface in a shape of an inclined surface, wherein an outer diameter of the inclined surface is expanding from the upstream side to the downstream side in a fluid flow direction.

2. The check valve according to claim 1, wherein one valve part of the plurality of valve parts further comprises a valve seat including an orifice through which fluid passes, an elastic member elastically supporting one side of the opening/closing members which is selectively in contact with the orifice, and a filter cap engaged with the valve seat to receive the opening/closing members and supporting the other side of the elastic member.

3. The check valve according to claim 2, wherein a valve seat of another valve part adjacent to the one valve part is engaged with a filter cap of the one valve part of the plurality of valve parts.

4. The check valve according to claim 1, wherein the opening/closing members provided in at least one of the plurality of valve parts are provided in a ball shape.

5. A brake system comprising: a check valve which is provided according to claim 1; a reservoir in which a pressurizing medium is stored; a master cylinder which is connected to the reservoir, the master cylinder having a master chamber and a master piston for discharging the pressurizing medium in response to a tread force of a brake pedal; a hydraulic pressure supply device which operates by an electrical signal to generate a hydraulic pressure; and a hydraulic control unit which has a first hydraulic circuit and a second hydraulic circuit to transmit the hydraulic pressure discharged from the hydraulic pressure supply device to wheel cylinders provided on two wheels, respectively, wherein the check valve is installed in a flow path connecting the hydraulic pressure supply device and the hydraulic control unit, and selectively transmits the hydraulic pressure of the hydraulic pressure supply device to the first hydraulic circuit or the second hydraulic circuit.

* * * * *